(12) United States Patent
Boggs et al.

(10) Patent No.: US 10,175,802 B2
(45) Date of Patent: Jan. 8, 2019

(54) VEHICLE INTERIOR SYSTEMS HAVING A CURVED COVER GLASS AND DISPLAY OR TOUCH PANEL AND METHODS FOR FORMING THE SAME

(71) Applicant: CORNING INCORPORATED, Corning, NY (US)

(72) Inventors: Jordon Thomas Boggs, Wellsboro, PA (US); Michael Timothy Brennan, Painted Post, NY (US); Atul Kumar, Horseheads, NY (US); Arpita Mitra, Big Flats, NY (US); William Michael Seiderman, Corning, NY (US); Yawei Sun, Elmira, NY (US); Wendell Porter Weeks, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/877,724

(22) Filed: Jan. 23, 2018

(65) Prior Publication Data

US 2018/0188870 A1    Jul. 5, 2018

Related U.S. Application Data

(63) Continuation of application No. 15/860,850, filed on Jan. 3, 2018.
(Continued)

(51) Int. Cl.
*B32B 17/10*     (2006.01)
*G06F 3/041*     (2006.01)
(Continued)

(52) U.S. Cl.
CPC ...... *G06F 3/0412* (2013.01); *B32B 17/10036* (2013.01); *B32B 17/10889* (2013.01);
(Continued)

(58) Field of Classification Search
CPC . G06F 3/0412; B32B 17/00; B32B 17/10018; B32B 17/10036;
(Continued)

(56) References Cited

U.S. PATENT DOCUMENTS

| 4,899,507 A | 2/1990 | Mairlot |
| 4,985,099 A | 1/1991 | Mertens et al. |

(Continued)

FOREIGN PATENT DOCUMENTS

| CN | 203825589 U | 9/2014 |
| CN | 102566841 B | 4/2015 |

(Continued)

OTHER PUBLICATIONS

Invitation to Pay Additional Fees of the International Searching Authority; PCT/US2018/012215; dated May 11, 2018; 13 Pages; European Patent Office.
(Continued)

*Primary Examiner* — Catherine A. Simone
(74) *Attorney, Agent, or Firm* — Payal A. Patel

(57) ABSTRACT

Embodiments of a vehicle interior system are disclosed. In one or more embodiments, the system includes a base with a curved surface, and a display or touch panel disposed on the curved surface. The display includes a cold-bent glass substrate with a thickness of 1.5 mm or less and a first radius of curvature of 20 mm or greater, and a display module and/or touch panel attached to the glass substrate having a second radius of curvature that is within 10% of the first radius of curvature. Methods for forming such systems are also disclosed.

30 Claims, 18 Drawing Sheets

Related U.S. Application Data

(60) Provisional application No. 62/599,928, filed on Dec. 18, 2017, provisional application No. 62/548,026, filed on Aug. 21, 2017, provisional application No. 62/530,579, filed on Jul. 10, 2017, provisional application No. 62/529,782, filed on Jul. 7, 2017, provisional application No. 62/441,651, filed on Jan. 3, 2017.

(51) Int. Cl.
*B60K 37/06* (2006.01)
*C03B 23/035* (2006.01)
*G02F 1/1333* (2006.01)

(52) U.S. Cl.
CPC .......... *B60K 37/06* (2013.01); *C03B 23/0357* (2013.01); *G02F 1/13338* (2013.01); *B60K 2350/106* (2013.01); *B60K 2350/1028* (2013.01)

(58) Field of Classification Search
CPC ........ B32B 17/10091; B32B 17/10137; B32B 17/10889; B60K 2350/1028; B60K 2350/106; G02F 2001/133331
See application file for complete search history.

(56) References Cited

U.S. PATENT DOCUMENTS

| | | |
|---|---|---|
| 6,086,983 A | 7/2000 | Yoshizawa |
| 6,332,690 B1 | 12/2001 | Murofushi |
| 6,582,799 B1 | 6/2003 | Brown et al. |
| 7,375,782 B2 | 5/2008 | Yamazaki et al. |
| 8,344,369 B2 | 1/2013 | Yamazaki et al. |
| 8,549,885 B2 | 10/2013 | Dannoux et al. |
| 8,833,106 B2 | 9/2014 | Dannoux et al. |
| 8,912,447 B2 | 12/2014 | Leong et al. |
| 9,061,934 B2 | 6/2015 | Bisson et al. |
| 9,593,042 B2 | 3/2017 | Hu et al. |
| 9,802,485 B2 | 10/2017 | Masuda et al. |
| 9,895,975 B2 | 2/2018 | Lee et al. |
| 9,902,640 B2 | 2/2018 | Dannoux et al. |
| 9,931,817 B2 | 4/2018 | Rickerl |
| 2007/0223121 A1 | 9/2007 | Franck et al. |
| 2009/0179840 A1 | 7/2009 | Tanaka et al. |
| 2009/0185127 A1 | 7/2009 | Tanaka et al. |
| 2012/0202030 A1 | 8/2012 | Kondo et al. |
| 2013/0088441 A1 | 4/2013 | Chung et al. |
| 2016/0297176 A1 | 10/2016 | Rickerl |
| 2016/0306451 A1 | 10/2016 | Isoda et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0327402 A1 | 11/2017 | Fujii et al. |
| 2017/0349473 A1 | 12/2017 | Moriya et al. |
| 2018/0050948 A1 | 2/2018 | Faik et al. |
| 2018/0111569 A1 | 4/2018 | Faik et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0210118 A1 | 7/2018 | Gollier et al. |
| 2018/0245125 A1 | 8/2018 | Tsai et al. |

FOREIGN PATENT DOCUMENTS

| | | |
|---|---|---|
| CN | 104679341 A | 6/2015 |
| CN | 204463066 U | 7/2015 |
| CN | 104843976 A | 8/2015 |
| CN | 105511127 A | 4/2016 |
| DE | 4415878 A1 | 11/1995 |
| DE | 10200402208 A1 | 12/2004 |
| FR | 2918411 A1 | 10/2013 |
| FR | 2918411 B1 | 10/2013 |
| GB | 2011316 A | 7/1979 |
| JP | 3059337 U | 6/1991 |
| JP | 2015092422 A | 5/2015 |
| JP | 2016031696 A | 3/2016 |
| JP | 5976561 B2 | 8/2016 |
| JP | 2016173794 A | 9/2016 |
| JP | 2016203609 A | 12/2016 |
| WO | 199801649 A1 | 1/1998 |
| WO | 2007108861 A1 | 9/2007 |
| WO | 2012058084 A2 | 5/2012 |
| WO | 2015031594 A2 | 3/2015 |
| WO | 2016044360 A1 | 3/2016 |
| WO | 2016196531 A1 | 12/2016 |
| WO | 2016196546 A1 | 12/2016 |
| WO | 2017155932 A1 | 9/2017 |
| WO | 2018005646 A1 | 1/2018 |
| WO | 2018009504 A1 | 1/2018 |
| WO | 2018075853 A1 | 4/2018 |
| WO | 2018081068 A1 | 5/2018 |
| WO | 2018125683 A1 | 7/2018 |

OTHER PUBLICATIONS

International Search Report and Written Opinion of the International Searching Authority; PCT/US2018/012215 dated Aug. 1, 2018; 21 Pgs; European Patent Office.

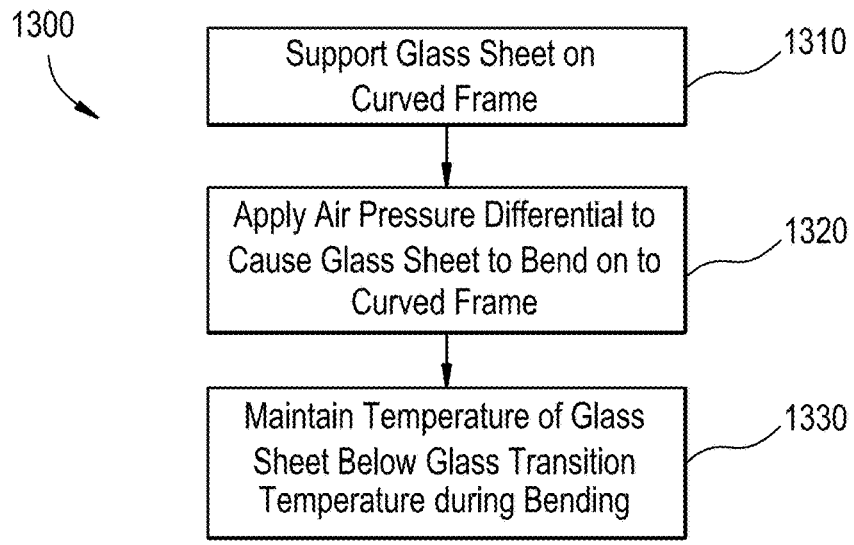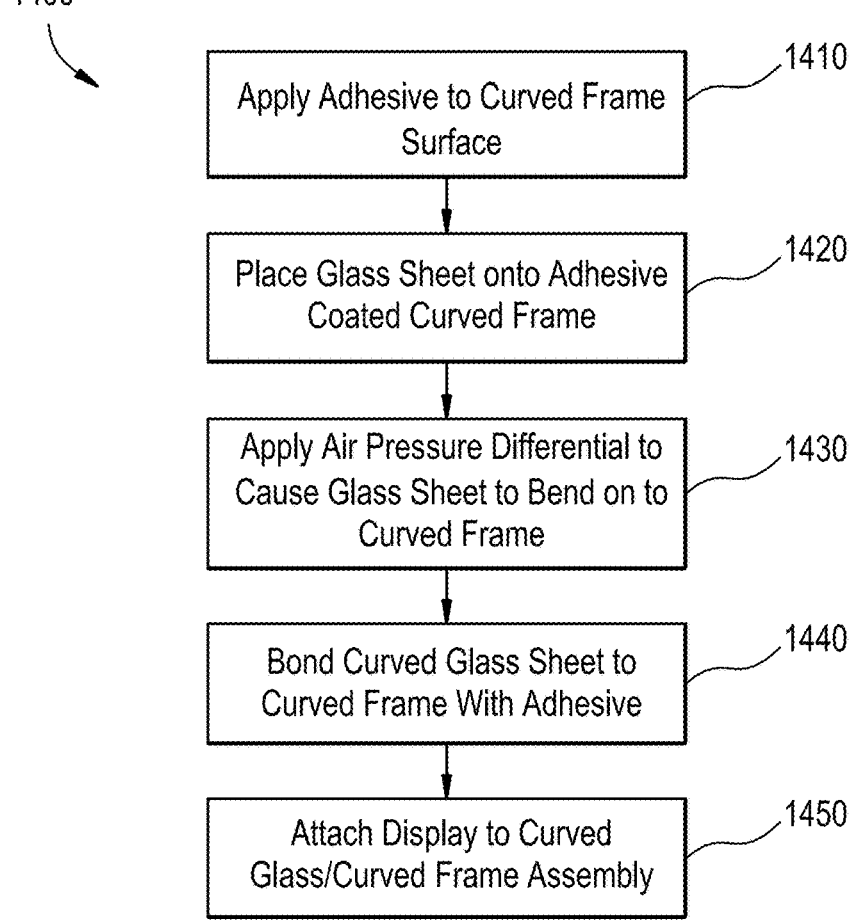

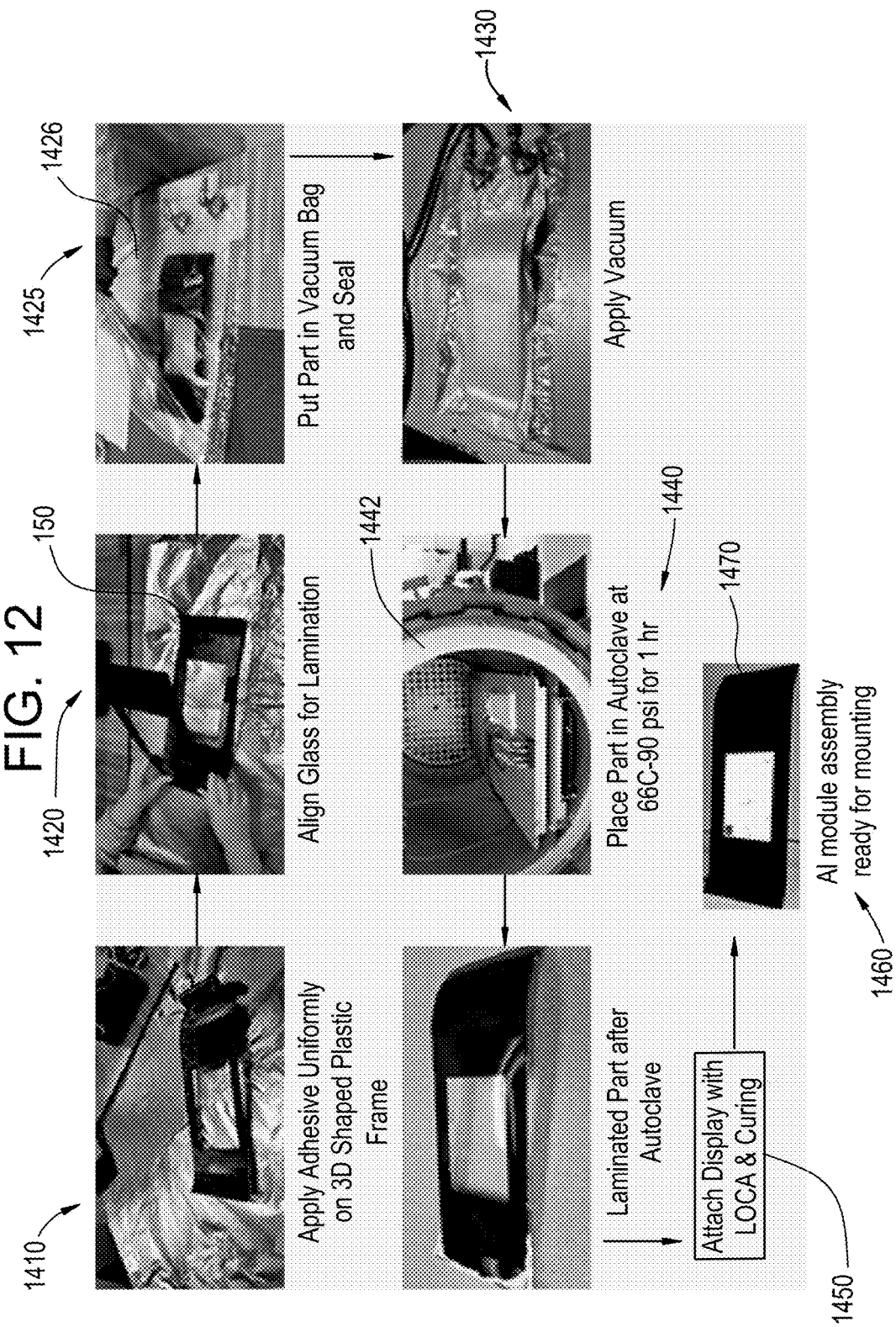

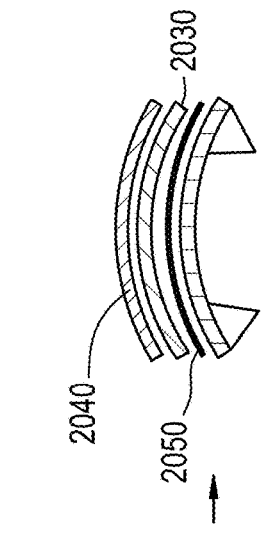
FIG. 16A
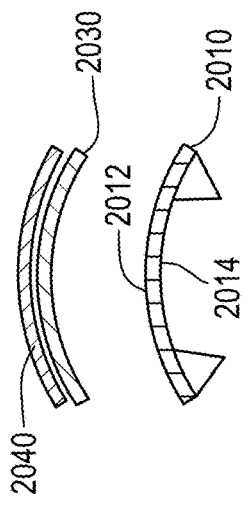
FIG. 16B
FIG. 16C
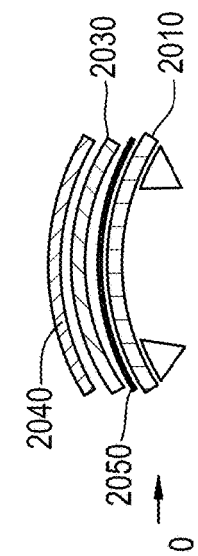
FIG. 16D
FIG. 16E
FIG. 16F
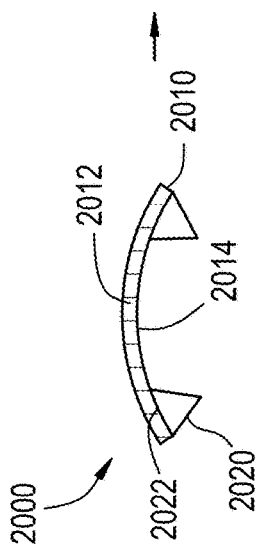
FIG. 16G
FIG. 16H
FIG. 16I

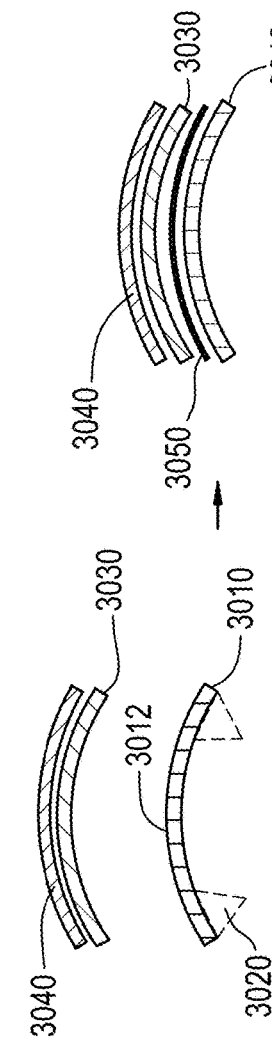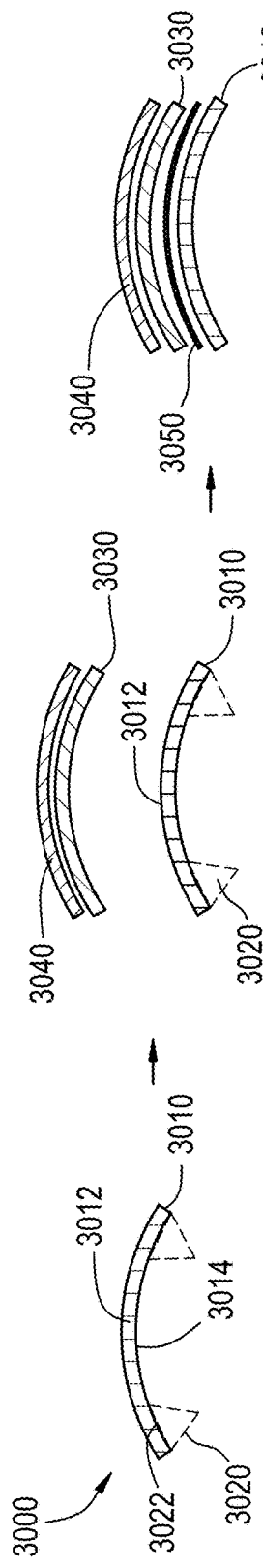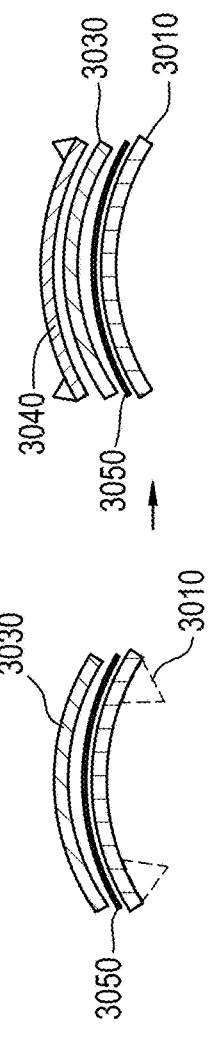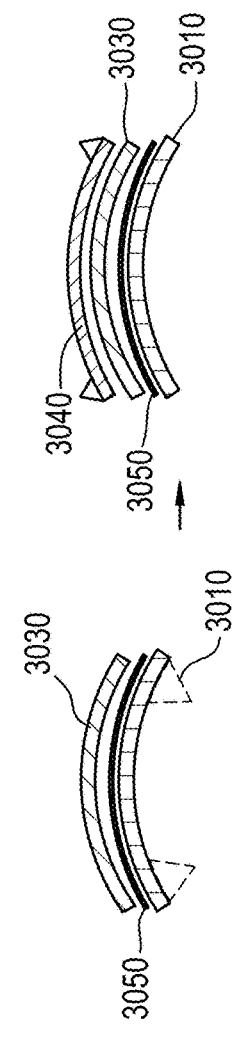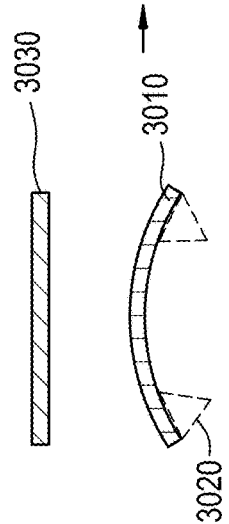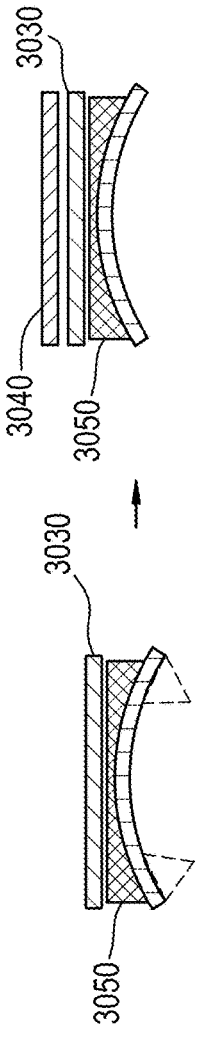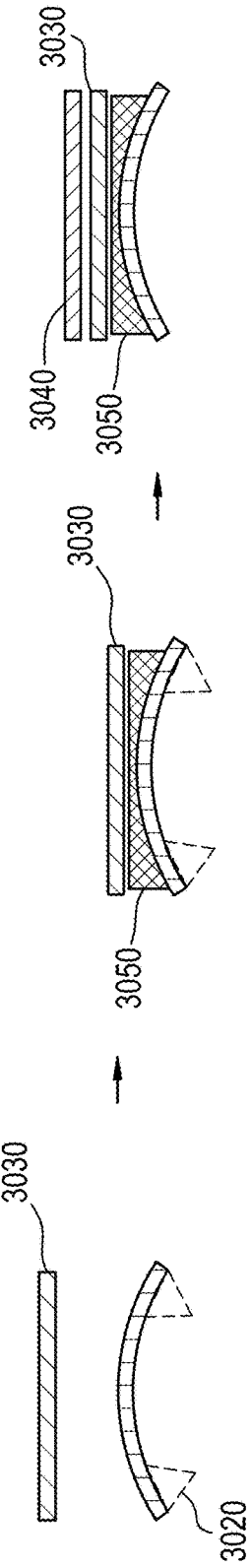

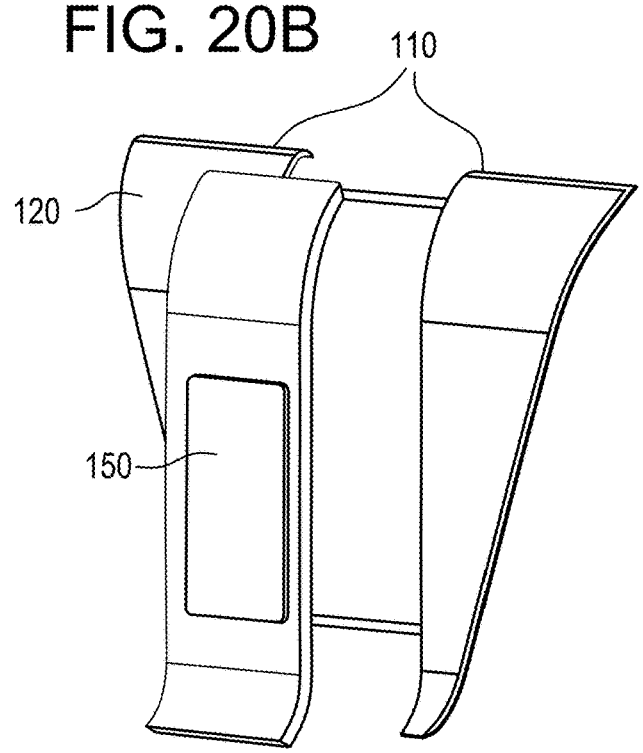
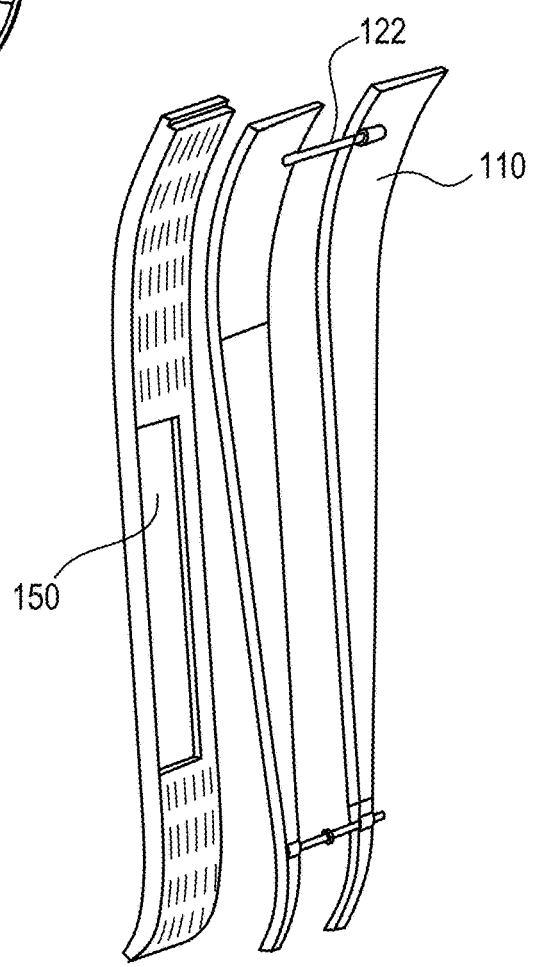

VEHICLE INTERIOR SYSTEMS HAVING A CURVED COVER GLASS AND DISPLAY OR TOUCH PANEL AND METHODS FOR FORMING THE SAME

CROSS-REFERENCE TO RELATED APPLICATIONS

This application is a continuation and claims the benefit of priority under 35 U.S.C. § 120 of U.S. patent application Ser. No. 15/860,850, filed on Jan. 3, 2018, which claims the benefit of priority under 35 U.S.C. § 119 of U.S. Provisional Patent Application Ser. No. 62/599,928, filed on Dec. 18, 2017, U.S. Provisional Patent Application Ser. No. 62/548,026, filed on Aug. 21, 2017, U.S. Provisional Patent Application Ser. No. 62/530,579, filed on Jul. 10, 2017, U.S. Provisional Patent Application Ser. No. 62/529,782, filed on Jul. 7, 2017, and U.S. Provisional Patent Application Ser. No. 62/441,651, filed Jan. 3, 2017, the contents of which are relied upon and incorporated herein by reference in their entirety.

BACKGROUND

The disclosure relates to vehicle interior systems including cover glass and methods for forming the same, and more particularly to vehicle interior systems including a display and/or touch panel with a curved cover glass and methods for forming the same.

Vehicle interiors include curved surfaces and can incorporate displays and/or touch panel. The materials used to form such curved surfaces are typically limited to polymers, which do not exhibit the durability and optical performance of glass. As such, curved glass substrates are desirable, especially when used as covers for displays and/or touch panels. Existing methods of forming curved glass substrates, such as thermal forming, have drawbacks including high cost, and optical distortion and/or surface marking occurring during curving. Accordingly, there is a need for vehicle interior systems that can incorporate a curved glass substrate in a cost-effective manner and without the problems typically associated with glass thermal forming processes.

SUMMARY

A first aspect of this disclosure pertains to a vehicle interior system. In one or more embodiments, the vehicle interior system includes a base having a curved surface, and a display disposed on the curved surface. As used herein, throughout this disclosure unless otherwise noted, where a display or display module is used, a touch panel may be substituted or used in addition to the display or display module. The display of one or more embodiments includes a cold-bent glass substrate having a first major surface, a second major surface opposing the first major surface and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width, and wherein the thickness is 1.5 mm or less, and wherein the second major surface comprises a first radius of curvature of 20 mm or greater, 60 mm or greater, or 250 mm or greater. Unless otherwise specified, the curvature described herein may be convex, concave, or may have a combination of convex and concave portions having the same or different radii from one another.

The display may include a display module attached to the second major surface of the curved glass substrate. In one or more embodiments, the display module is flat, curved or flexible. In one or more specific embodiments, the display (or a portion thereof such as a second glass substrate) comprises a second radius of curvature that is within 10% of the first radius of curvature. In one or more specific embodiments, the first radius of curvature may be within 10% of the second radius of curvature or the radius of curvature of the curved substrate of the base on which the vehicle interior system is assembled. The display may further include an adhesive between the glass substrate and the display module. The display module of one or more embodiments includes a second glass substrate and an optional backlight unit, wherein the second glass substrate is disposed adjacent the first major surface and between the optional backlight unit and the first major surface, and wherein either one or both the second glass substrate and the optional backlight unit is curved to exhibit the second radius of curvature. In one or more embodiments, only the second glass substrate is curved to the second radius of curvature and the remaining portions of the display module are flat.

A second aspect of this disclosure pertains to a method of forming a display. In one or more embodiments, the method includes cold-bending a glass substrate having a first major surface and a second major surface opposite the first major surface to a first radius of curvature as measured on the second major surface, and laminating a display module to the first major surface while maintaining the first radius of curvature in the glass substrate to form the display. In one or more embodiments, the display module (or a portion thereof such as a second glass substrate) has a second radius of curvature that is within 10% of the first radius of curvature. In one or more embodiments, cold-bending the glass substrate may include applying a vacuum to the second major surface to generate the first radius of curvature. The method may include laminating an adhesive to the glass substrate before laminating the display module such that the adhesive is disposed between the glass substrate and the display module. In one or more embodiments, laminating the display module may include laminating a second glass substrate to the glass substrate; and attaching a backlight unit to the second glass substrate. In one or more embodiments, the method includes curving either one of or both the second glass substrate and the backlight unit to the second radius of curvature. In one or more embodiments, only the second glass substrate is curved to the second radius of curvature and the remaining portions of the display module are flat (such as the backlight unit).

Another aspect of the disclosure pertains to a method of cold-bending a glass substrate. The method includes supporting a glass substrate on a frame. In one or more embodiments, the glass substrate has a first major surface and a second major surface opposite the first major surface, and the frame has a curved support surface. The first major surface of the glass substrate may face the curved support surface of the frame. In one or more embodiments, the method includes applying an air pressure differential to the glass substrate while supported by the frame causing the glass substrate to bend such that the glass substrate conforms to the curved shape of the curved support surface of the frame, forming a curved glass substrate. The first major surface of the curved glass substrate includes a curved section and the second major surface of the curved glass substrate includes a curved section. In one or more embodiments, during application of the air pressure differential, a maximum temperature of the glass substrate is less than a glass softening point of the glass substrate.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 10 is a flow diagram of a process for forming a display, according to another exemplary embodiment.

FIG. 11 is a flow diagram of a process for forming a display, according to another exemplary embodiment.

FIG. 12 is a detailed view of the process of FIG. 11, according to another exemplary embodiment.

FIGS. 16A-16I are side views of a kit according to one or more embodiments.

FIGS. 17A-17I are side views of a kit according to one or more embodiments.

FIG. 20B shows a front exploded view of the frame shown in FIG. 20A before assembly with a vehicle interior system.

FIG. 20C shows a back exploded view of the frame shown in FIG. 20A before assembly with a vehicle interior system.

DETAILED DESCRIPTION

Figure 1:
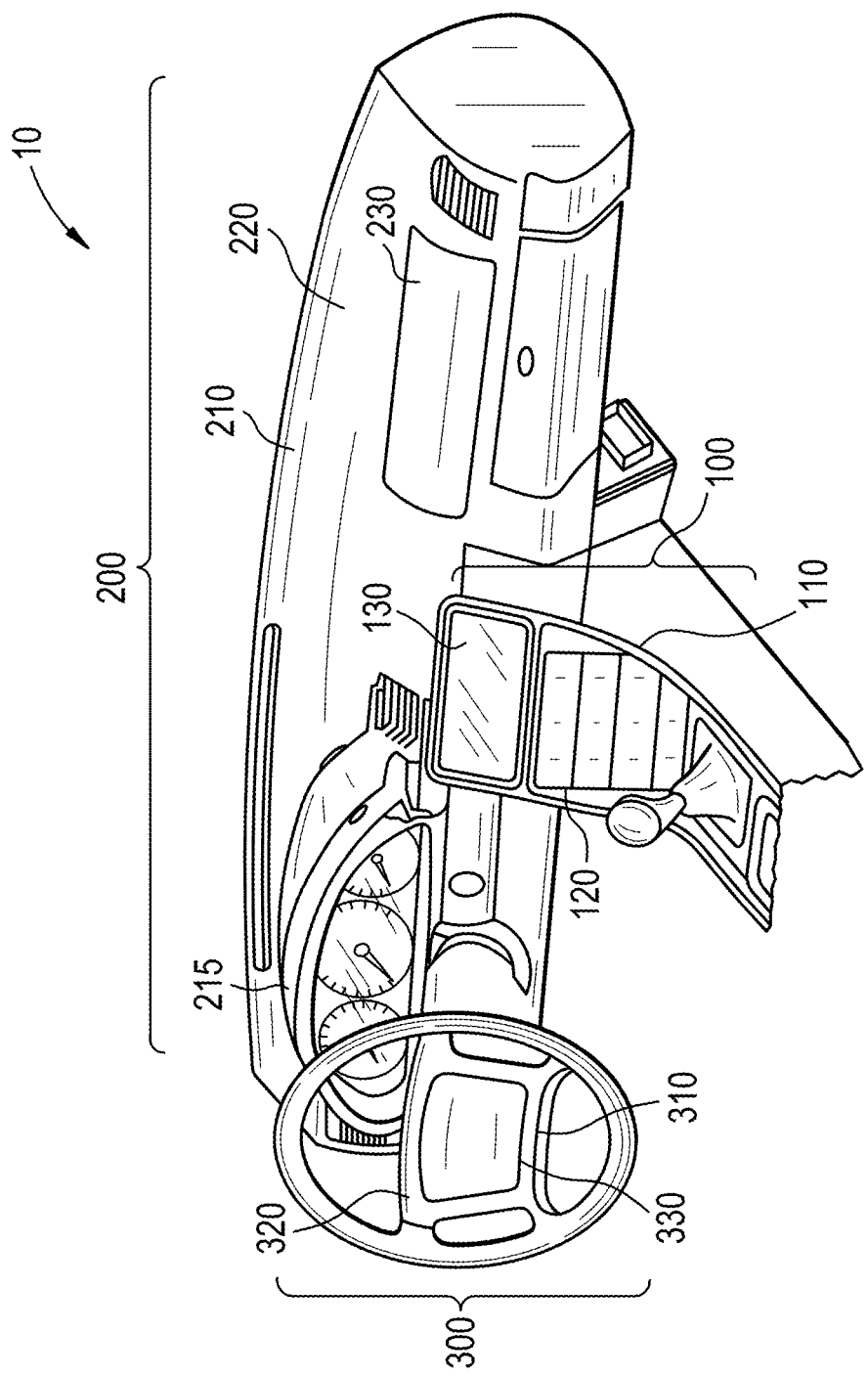
FIG. 1 is a perspective view illustration of a vehicle interior with vehicle interior systems according to one or more embodiments.

Reference will now be made in detail to various embodiments, examples of which are illustrated in the accompanying drawings. In general, a vehicle interior system may include a variety of different curved surfaces that are designed to be transparent, such as display surfaces, and the present disclosure provides articles and methods for forming these curved surfaces from a glass material. Forming curved vehicle surfaces from a glass material provides a number of advantages compared to the typical curved plastic panels that are conventionally found in vehicle interiors. For example, glass is typically considered to provide enhanced functionality and user experience for many curved cover material applications, such as display applications and touch screen applications, compared to plastic cover materials.

Curved glass articles are typically formed using hot forming processes. As discussed herein a variety of curved glass articles and processes for making the same are provided that avoid the deficiencies of the typical glass hot-forming process. For example, hot-forming processes are energy intensive and increase the cost of forming a curved glass component, relative to the cold-bending process discussed herein. In addition, hot-forming processes typically make application of coatings, such as anti-reflective coatings, significantly more difficult because many coating materials cannot be applied to a flat piece of glass material prior to the hot-forming process as the coating material typically will not survive the high temperatures of the hot-forming process. Further, application of a coating material to surfaces of a curved glass substrate after hot-bending that also meets performance requirements is substantially more difficult than application to a flat glass substrate. In addition, by avoiding the additional high temperature heating steps needed for thermal forming, the glass articles produced via the cold-bending processes and systems discussed herein may have improved optical properties and/or improved surface properties than similarly shaped glass articles made via thermal-shaping processes.

In addition to these advantages relative to plastic cover sheets and hot-formed cover glass, the systems and processes disclosed herein specifically provide for cold-bending of thin glass substrates in an economical and efficient process. In one or more embodiments, air pressure (e.g., a vacuum or overpressure) is used to bend the glass substrate to quickly and accurately conform the glass substrate to a curved frame. Further, in some specific embodiments, the systems and processes described herein provide for such bending and additional curing of bonding adhesive within common equipment and/or common processing steps. In addition, the processes and systems discussed herein may also allow for attachment of the display components to the glass cover substrate during bending utilizing common equipment and/or common processing steps.

A first aspect of the instant application pertains to a vehicle interior system. The various embodiments of the vehicle interior system may be incorporated into vehicles such as trains, automobiles (e.g., cars, trucks, buses and the like), seacraft (boats, ships, submarines, and the like), and aircraft (e.g., drones, airplanes, jets, helicopters and the like).

FIG. 1 illustrates an exemplary vehicle interior 10 that includes three different embodiments of a vehicle interior system 100, 200, 300. Vehicle interior system 100 includes a center console base 110 with a curved surface 120 including a display 130. Vehicle interior system 200 includes a dashboard base 210 with a curved surface 220 including a display 230. The dashboard base 210 typically includes an instrument panel 215 which may also include a display. Vehicle interior system 300 includes a dashboard steering wheel base 310 with a curved surface 320 and a display 330. In one or more embodiments, the vehicle interior system may include a base that is an arm rest, a pillar, a seat back, a floor board, a headrest, a door panel, or any portion of the interior of a vehicle that includes a curved surface.

The embodiments of the display described herein can be used interchangeably in each of vehicle interior systems 100, 200 and 300. Further, the curved glass substrates discussed herein may be used as curved cover glasses for any of the display embodiments discussed herein, including for use in vehicle interior systems 100, 200 and/or 300. As used herein, the term "glass substrate" is used in its broadest sense to include any object made wholly or partly of glass. Glass substrates include laminates of glass and non-glass materials, laminates of glass and crystalline materials, and glass-ceramics (including an amorphous phase and a crystalline phase). The glass substrate may be transparent or opaque. In one or more embodiments, the glass substrate may include a colorant that provides a specific color.

Figure 2:
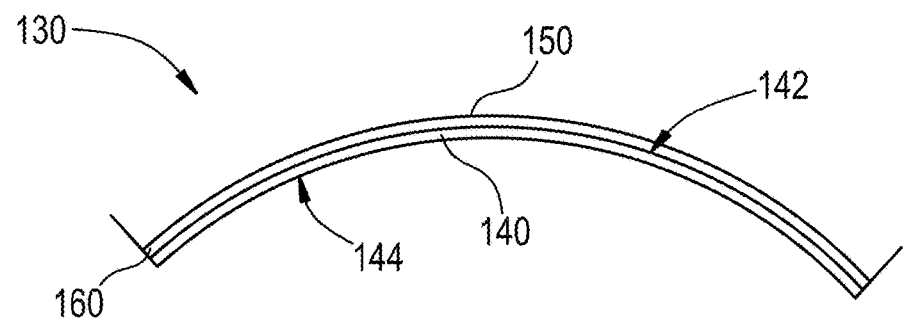
FIG. 2 is a side view illustration of a display including a curved glass substrate and a curved display module, according to one or more embodiments.

As shown in FIG. 2, in one or more embodiments the display 130 includes cold-bent curved glass substrate 140 having a first radius of curvature and a display module 150 attached to the glass substrate, wherein at least a portion of the display module 150 has a second radius of curvature that approximates or matches the first radius of curvature, to provide a display with a curved glass substrate as a cover glass that can be integrated into the curved surface of a vehicle interior system.

Figure 3:
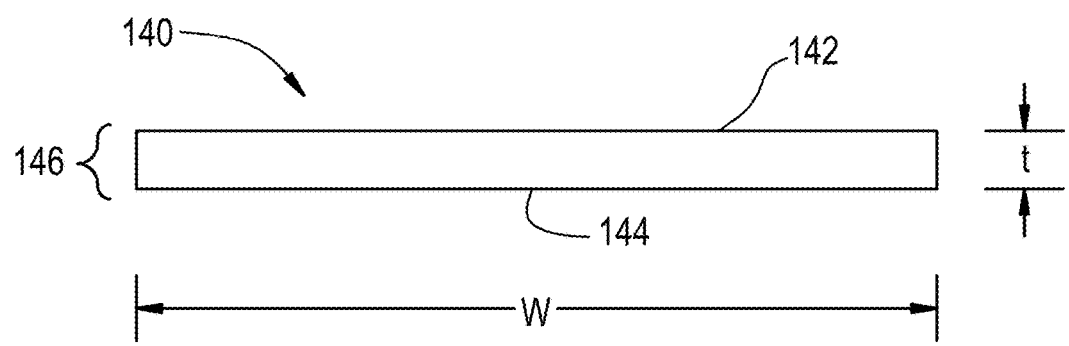
FIG. 3 is a side view illustration of the glass substrate used in the display of FIG. 2.
Figure 4:
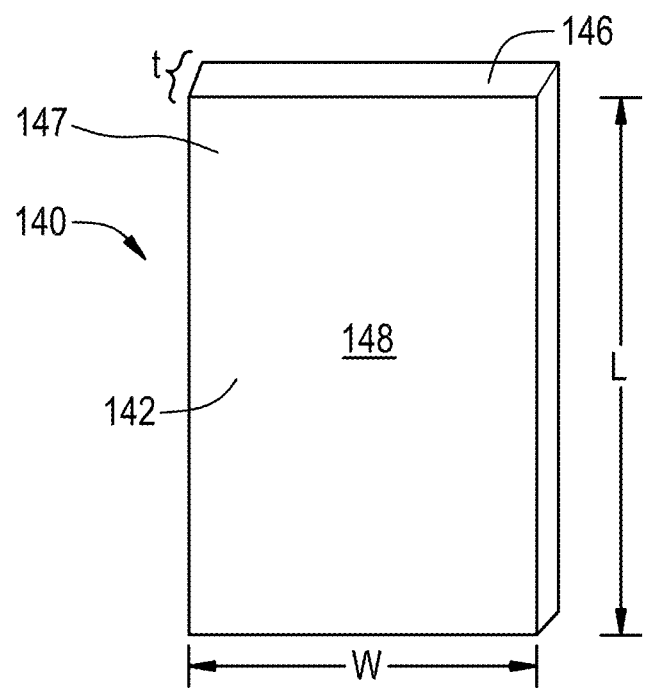
FIG. 4 is a front perspective view illustration of the glass substrate of FIG. 3.

Referring to FIGS. 3 and 4, the glass substrate 140 includes a first major surface 142 and a second major surface 144 opposite the first major surface. The cold-bent glass substrate exhibits the first radius of curvature as measured on the second major surface 144.

As used herein, the terms "cold-bent," or "cold-bending" refers to curving the glass substrate at a cold-bend temperature which is less than the softening point of the glass (as described herein). The term "cold-bendable" refers to the capability of a glass substrate to be cold-bent. A feature of a cold-bent glass substrate is asymmetric surface compressive stress between the first major surface 142 and the second major surface 144. A minor surface 146 connects the first major surface 142 and the second major surface 144. In one or more embodiments, prior to the cold-bending process or being cold-bent, the respective compressive stresses in the first major surface 142 and the second major surface 144 of the glass substrate are substantially equal. In one or more embodiments in which the glass substrate is unstrengthened, the first major surface 142 and the second major surface 144 exhibit no appreciable compressive stress, prior to cold-bending. In one or more embodiments in which the glass substrate is strengthened (as described herein), the first major surface 142 and the second major surface 144 exhibit substantially equal compressive stress with respect to one another, prior to cold-bending. In one or more embodiments, after cold-bending (shown, for example, in FIGS. 2 and 7, the compressive stress on the surface having a concave shape after bending (e.g., second major surface 144 in FIGS. 2 and 7) increases. In other words, the compressive stress on the concave surface (e.g., second major surface 144) is greater after cold-bending than before cold-bending. Without being bound by theory, the cold-bending process increases the compressive stress of the glass substrate being shaped to compensate for tensile stresses imparted during bending and/or forming operations. In one or more embodiments, the cold-bending process causes the concave surface (second major surface 144) to experience compressive stresses, while the surface forming a convex shape (i.e., the first major surface 142 in FIGS. 2 and 7) after cold-bending experiences tensile stresses. The tensile stress experienced by the convex (i.e., the first major surface 142) following cold-bending results in a net decrease in surface compressive stress, such that the compressive stress in convex surface (i.e., the first major surface 142) of a strengthened glass substrate following cold-bending is less than the compressive stress on the same surface (i.e., first major surface 142) when the glass substrate is flat.

When a strengthened glass substrate is utilized, the first major surface and the second major surface (142, 144) comprise a compressive stress that is substantially equal to one another prior to cold-bending, and thus the first major surface can experience greater tensile stress during cold-bending without risking fracture. This allows for the strengthened glass substrate to conform to more tightly curved surfaces or shapes.

In one or more embodiments, the thickness of the glass substrate is tailored to allow the glass substrate to be more flexible to achieve the desired radius of curvature. Moreover, a thinner glass substrate 140 may deform more readily, which could potentially compensate for shape mismatches and gaps that may be created by the shape of the display module 150 (when curved). In one or more embodiments, a thin and strengthened glass substrate 140 exhibits greater flexibility especially during cold-bending. The greater flexibility of the glass substrates discussed herein may both allow for sufficient degrees of bending to be created via the air pressure-based bending processes as discussed herein and also for consistent bend formation without heating. In one or more embodiments, the glass substrate 140 and at least a portion of the display module 150 have substantially similar radii of curvature to provide a substantially uniform distance between the first major surface 142 and the display module 150 (which may be filled with an adhesive).

In one or more embodiments, the cold-bent glass substrate (and optionally the curved display module) may have a compound curve including a major radius and a cross curvature. A complexly curved cold-bent glass substrate (and optionally the curved display module) according to one or more embodiments may have a distinct radius of curvature in two independent directions. According to one or more embodiments, the complexly curved cold-bent glass substrate (and optionally the curved display module) may thus be characterized as having "cross curvature," where the cold-bent glass substrate (and optionally the curved display module) are curved along an axis (i.e., a first axis) that is parallel to a given dimension and also curved along an axis (i.e., a second axis) that is perpendicular to the same dimension. The curvature of the cold-bent glass substrate (and optionally the curved display module) can be even more complex when a significant minimum radius is combined with a significant cross curvature, and/or depth of bend.

In the embodiment shown, the glass substrate has a thickness (t) that is substantially constant and is defined as a distance between the first major surface 142 and the second major surface 144. The thickness (t) as used herein refers to the maximum thickness of the glass substrate. In the embodiment shown in FIGS. 3-4, the glass substrate includes a width (W) defined as a first maximum dimension of one of the first or second major surfaces orthogonal to the thickness (t), and a length (L) defined as a second maximum dimension of one of the first or second surfaces orthogonal to both the thickness and the width. In other embodiments, the dimensions discussed herein may be average dimensions.

In one or more embodiments, the glass substrate has a thickness (t) that is about 1.5 mm or less. For example, the thickness may be in a range from about 0.01 mm to about 1.5 mm, 0.02 mm to about 1.5 mm, 0.03 mm to about 1.5 mm, 0.04 mm to about 1.5 mm, 0.05 mm to about 1.5 mm, 0.06 mm to about 1.5 mm, 0.07 mm to about 1.5 mm, 0.08 mm to about 1.5 mm, 0.09 mm to about 1.5 mm, 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.01 mm to about 1.4 mm, from about 0.01 mm to about 1.3 mm, from about 0.01 mm to about 1.2 mm, from about 0.01 mm to about 1.1 mm, from about 0.01 mm to about 1.05 mm, from about 0.01 mm to about 1 mm, from about 0.01 mm to about 0.95 mm, from about 0.01 mm to about 0.9 mm, from about 0.01 mm to about 0.85 mm, from about 0.01 mm to about 0.8 mm, from about 0.01 mm to about 0.75 mm, from about 0.01 mm to about 0.7 mm, from about 0.01 mm to about 0.65 mm, from about 0.01 mm to about 0.6 mm, from about 0.01 mm to about 0.55 mm, from about 0.01 mm to about 0.5 mm, from about 0.01 mm to about 0.4 mm, from about 0.01 mm to about 0.3 mm, from about 0.01 mm to about 0.2 mm, from about 0.01 mm to about 0.1 mm, from about 0.04 mm to about 0.07 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

In one or more embodiments, the glass substrate has a width (W) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the glass substrate has a length (L) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the glass substrate may be strengthened. In one or more embodiments, the glass substrate may be strengthened to include compressive stress that extends from a surface to a depth of compression (DOC). The compressive stress regions are balanced by a central portion exhibiting a tensile stress. At the DOC, the stress crosses from a compressive stress to a tensile stress. The compressive stress and the tensile stress are provided herein as absolute values.

In one or more embodiments, the glass substrate may be strengthened mechanically by utilizing a mismatch of the coefficient of thermal expansion between portions of the article to create a compressive stress region and a central region exhibiting a tensile stress. In some embodiments, the glass substrate may be strengthened thermally by heating the glass to a temperature above the glass transition point and then rapidly quenching.

In one or more embodiments, the glass substrate may be chemically strengthening by ion exchange. In the ion exchange process, ions at or near the surface of the glass substrate are replaced by—or exchanged with—larger ions having the same valence or oxidation state. In those embodiments in which the glass substrate comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass substrate generate a stress.

Ion exchange processes are typically carried out by immersing a glass substrate in a molten salt bath (or two or more molten salt baths) containing the larger ions to be exchanged with the smaller ions in the glass substrate. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass substrate in a salt bath (or baths), use of multiple salt baths, additional steps such as annealing, washing, and the like, are generally determined by the composition of the glass substrate (including the structure of the article and any crystalline phases present) and the desired DOC and CS of the glass substrate that results from strengthening. Exemplary molten bath composition may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass substrate thickness, bath temperature and glass (or monovalent ion) diffusivity. However, temperatures and immersion times different from those described above may also be used.

In one or more embodiments, the glass substrates may be immersed in a molten salt bath of 100% $NaNO_3$, 100% $KNO_3$, or a combination of $NaNO_3$ and $KNO_3$ having a temperature from about 370° C. to about 480° C. In some embodiments, the glass substrate may be immersed in a molten mixed salt bath including from about 1% to about 99% $KNO_3$ and from about 1% to about 99% $NaNO_3$. In one or more embodiments, the glass substrate may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass substrate may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass substrate. The spike may result in a greater surface CS value. This spike can be achieved by single bath or multiple baths, with the bath(s) having a single composition or mixed composition, due to the unique properties of the glass compositions used in the glass substrates described herein.

In one or more embodiments, where more than one monovalent ion is exchanged into the glass substrate, the different monovalent ions may exchange to different depths within the glass substrate (and generate different magnitudes stresses within the glass substrate at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass substrate. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass substrate is chemically strengthened by an ion exchange treatment, FSM or SCALP may be used depending on which ion is exchanged into the glass substrate. Where the stress in the glass substrate is generated by exchanging potassium ions into the glass substrate, FSM is used to measure DOC. Where the stress is generated by exchanging sodium ions into the glass substrate, SCALP is used to measure DOC. Where the stress in the glass substrate is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by FSM. Central tension or CT is the maximum tensile stress and is measured by SCALP.

In one or more embodiments, the glass substrate maybe strengthened to exhibit a DOC that is described a fraction of the thickness t of the glass substrate (as described herein). For example, in one or more embodiments, the DOC may be equal to or greater than about 0.05t, equal to or greater than about 0.1t, equal to or greater than about 0.11t, equal to or greater than about 0.12t, equal to or greater than about 0.13t, equal to or greater than about 0.14t, equal to or greater than about 0.15t, equal to or greater than about 0.16t, equal to or greater than about 0.17t, equal to or greater than about 0.18t, equal to or greater than about 0.19t, equal to or greater than about 0.2t, equal to or greater than about 0.21t. In some embodiments, The DOC may be in a range from about 0.08t to about 0.25t, from about 0.09t to about 0.25t, from about 0.18t to about 0.25t, from about 0.11t to about 0.25t, from about 0.12t to about 0.25t, from about 0.13t to about 0.25t, from about 0.14t to about 0.25t, from about 0.15t to about 0.25t, from about 0.08t to about 0.24t, from about 0.08t to about 0.23t, from about 0.08t to about 0.22t, from about 0.08t to about 0.21t, from about 0.08t to about 0.2t, from about 0.08t to about 0.19t, from about 0.08t to about 0.18t, from about 0.08t to about 0.17t, from about 0.08t to about 0.16t, or from about 0.08t to about 0.15t. In some instances, the DOC may be about 20 µm or less. In one or more embodiments, the DOC may be about 40 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm.

In one or more embodiments, the strengthened glass substrate may have a CS (which may be found at the surface or a depth within the glass substrate) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater. In one or more embodiments, the strengthened glass substrate may have a CS (which may be found at the surface or a depth within the glass substrate) from about 200 MPa to about 1050 MPa, from about 250 MPa to about 1050 MPa, from about 300 MPa to about 1050 MPa, from about 350 MPa to about 1050 MPa, from about 400 MPa to about 1050 MPa, from about 450 MPa to about 1050 MPa, from about 500 MPa to about 1050 MPa, from about 550 MPa to about 1050 MPa, from about 600 MPa to about 1050 MPa, from about 200 MPa to about 1000 MPa, from about 200 MPa to about 950 MPa, from about 200 MPa to about 900 MPa, from about 200 MPa to about 850 MPa, from about 200 MPa to about 800 MPa, from about 200 MPa to about 750 MPa, from about 200 MPa to about 700 MPa, from about 200 MPa to about 650 MPa, from about 200 MPa to about 600 MPa, from about 200 MPa to about 550 MPa, or from about 200 MPa to about 500 MPa.

In one or more embodiments, the strengthened glass substrate may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa, from about 50 MPa to about 100 MPa, from about 60 MPa to about 100 MPa, from about 70 MPa to about 100 MPa, from about 80 MPa to about 100 MPa, from about 40 MPa to about 90 MPa, from about 40 MPa to about 80 MPa, from about 40 MPa to about 70 MPa, or from about 40 MPa to about 60 MPa.

In some embodiments, the strengthened glass substrate exhibits a stress profile along the depth or thickness thereof that exhibits a parabolic-like shape, as described in U.S. Pat. No. 9,593,042, entitled "Glasses and glass ceramics including metal oxide concentration gradient", which is hereby incorporated by reference in its entirety. "Stress profile" refers to the changes in stress from the first major surface to the second major surface. The stress profile may be described in terms of MPa at a given micrometer of thickness or depth from the first major surface or the second major surface. In one or more specific embodiments, the stress profile is substantially free of a flat stress (i.e., compressive or tensile) portion or a portion that exhibits a substantially constant stress (i.e., compressive or tensile). In some embodiments, the region of the glass substrate exhibiting a tensile stress has a stress profile that is substantially free of a flat stress or free of a substantially constant stress. In one or more embodiments, all points of the stress profile between a thickness range from about 0·t up to about 0.2·t and greater than 0.8·t (or from about 0·t to about 0.3·t and greater than 0.7·t) comprise a tangent that is less than about −0.1 MPa/micrometers or greater than about 0.1 MPa/micrometers. In some embodiments, the tangent may be less than about −0.2 MPa/micrometers or greater than about 0.2 MPa/micrometers. In some more specific embodiments, the tangent may be less than about −0.3 MPa/micrometers or greater than about 0.3 MPa/micrometers. In an even more specific embodiment, the tangent may be less than about −0.5 MPa/micrometers or greater than about 0.5 MPa/micrometers. In other words, the stress profile of one or more embodiments along these thickness ranges (i.e., 0·t up to about 2·t and greater than 0.8t, or from about 0t to about 0.3·t and 0.7·t or greater) exclude points having a tangent, as described herein. In contrast, stress profiles that exhibit error function or quasi-linear shapes have points along these thickness ranges (i.e., 0·t up to about 2·t and greater than 0.8·t, or from about 0·t to about 0.3·t and 0.7·t or greater) that have a tangent that is from about −0.1 MPa/micrometers to about 0.1 MPa/micrometers, from about −0.2 MPa/micrometers to about 0.2 MPa/micrometers, from about −0.3 MPa/micrometers to about 0.3 MPa/micrometers, or from about −0.5 MPa/micrometers to about 0.5 MPa/micrometers (indicating a flat or zero slope stress profile along such thickness ranges, as shown in FIG. 2, 220). The stress profiles of one or more embodiments of this disclosure do not exhibit such a stress profile having a flat or zero slope stress profile along these thickness ranges.

In one or more embodiments, the strengthened glass substrate exhibits a stress profile a thickness range from about 0.1·t to 0.3·t and from about 0.7·t to 0.9·t that comprises a maximum tangent and a minimum tangent. In some instances, the difference between the maximum tangent and the minimum tangent is about 3.5 MPa/micrometers or less, about 3 MPa/micrometers or less, about 2.5 MPa/micrometers or less, or about 2 MPa/micrometers or less.

In one or more embodiments, the stress profile of the strengthened glass substrate may be substantially free of any linear segments that extend in a depth direction or along at least a portion of the thickness t of the glass substrate. In other words, the stress profile is substantially continuously increasing or decreasing along the thickness t. In some embodiments, the stress profile is substantially free of any linear segments in a depth or thickness direction having a length of about 10 micrometers or more, about 50 micrometers or more, or about 100 micrometers or more, or about 200 micrometers or more. As used herein, the term "linear" refers to a slope having a magnitude of less than about 5 MPa/micrometer, or less than about 2 MPa/micrometer along the linear segment. In some embodiments, one or more portions of the stress profile that are substantially free of any linear segments in a depth direction are present at depths within the strengthened glass substrate of about 5 micrometers or greater (e.g., 10 micrometers or greater, or 15 micrometers or greater) from either one or both the first major surface or the second major surface. For example, along a depth or thickness of about 0 micrometers to less than about 5 micrometers from the first surface, the stress profile may include linear segments, but from a depth of about 5 micrometers or greater from the first surface, the stress profile may be substantially free of linear segments.

In some embodiments, the stress profile may include linear segments at depths from about 0t up to about 0.1t and may be substantially free of linear segments at depths of about 0.1t to about 0.4t. In some embodiments, the stress profile from a thickness in the range from about 0t to about 0.1t may have a slope in the range from about 20 MPa/microns to about 200 MPa/microns. As will be described herein, such embodiments may be formed using a single ion-exchange process by which the bath includes two or more alkali salts or is a mixed alkali salt bath or multiple (e.g., 2 or more) ion exchange processes.

In one or more embodiments, the strengthened glass substrate may be described in terms of the shape of the stress profile along the CT region or the region in the glass substrate that exhibits tensile stress. For example, in some embodiments, the stress profile along the CT region (where stress is in tension) may be approximated by equation. In some embodiments, the stress profile along the CT region may be approximated by equation (1):

$$\text{Stress}(x) = \text{MaxCT} - (((\text{MaxCT} \cdot (n+1))/0.5^n) \cdot |(x/t) - 0.5|^n) \quad (1)$$

In equation (1), the stress (x) is the stress value at position x. Here the stress is positive (tension). MaxCT is the maximum central tension as a positive value in MPa. The value x is position along the thickness (t) in micrometers, with a range from 0 to t; x=0 is one surface (302, in FIG. 3), x=0.5t is the center of the glass substrate, stress(x)=MaxCT, and x=t is the opposite surface (i.e., the first major surface or the second major surface). MaxCT used in equation (1) may be in the range from about 50 MPa to about 350 MPa (e.g., 60 MPa to about 300 MPa, or from about 70 MPa to about 270 MPa), and n is a fitting parameter from 1.5 to 5 (e.g., 2 to 4, 2 to 3 or 1.8 to 2.2) whereby n=2 can provide a parabolic stress profile, exponents that deviate from n=2 provide stress profiles with near parabolic stress profiles.

In one or more embodiments, the parabolic-like stress profile is generated due to a non-zero concentration of a metal oxide(s) that varies along a portion of the thickness. The variation in concentration may be referred to herein as a gradient. In some embodiments, the concentration of a metal oxide is non-zero and varies, both along a thickness range from about 0·t to about 0.3·t. In some embodiments, the concentration of the metal oxide is non-zero and varies along a thickness range from about 0·t to about 0.35·t, from about 0·t to about 0.4·t, from about 0·t to about 0.45·t or from about 0·t to about 0.48·t. The metal oxide may be described as generating a stress in the strengthened glass substrate. The variation in concentration may be continuous along the above-referenced thickness ranges. Variation in concentration may include a change in metal oxide concentration of about 0.2 mol % along a thickness segment of about 100 micrometers. This change may be measured by known methods in the art including microprobe. The metal oxide that is non-zero in concentration and varies along a portion of the thickness may be described as generating a stress in the strengthened glass substrate.

The variation in concentration may be continuous along the above-referenced thickness ranges. In some embodiments, the variation in concentration may be continuous along thickness segments in the range from about 10 micrometers to about 30 micrometers. In some embodiments, the concentration of the metal oxide decreases from the first surface to a point between the first surface and the second surface and increases from the point to the second surface.

The concentration of metal oxide may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while the at deeper depths, the concentration of ions having a smaller radius is greater than the concentration of ions having larger radius. For example, where a single Na- and K-containing bath is used in the ion exchange process, the concentration of K+ ions in the strengthened glass substrate is greater than the concentration of Na+ ions at shallower depths, while the concentration of Na+ is greater than the concentration of K+ ions at deeper depths. This is due, in part, due to the size of the ions. In such strengthened glass substrate, the area at or near the surface comprises a greater CS due to the greater amount of larger ions at or near the surface. This greater CS may be exhibited by a stress profile having a steeper slope at or near the surface (i.e., a spike in the stress profile at the surface).

The concentration gradient or variation of one or more metal oxides is created by chemically strengthening the glass substrate, for example, by the ion exchange processes previously described herein, in which a plurality of first metal ions in the glass substrate is exchanged with a plurality of second metal ions. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius than the first alkali metal ion. The second metal ion is present in the glass substrate as an oxide thereof (e.g., $Na_2O$, $K_2O$, $Rb_2O$, $Cs_2O$ or a combination thereof).

In one or more embodiments, the metal oxide concentration gradient extends through a substantial portion of the thickness t or the entire thickness t of the strengthened glass substrate, including the CT region. In one or more embodiments, the concentration of the metal oxide is about 0.5 mol % or greater in the CT region. In some embodiments, the concentration of the metal oxide may be about 0.5 mol % or greater (e.g., about 1 mol % or greater) along the entire thickness of the strengthened glass substrate, and is greatest at the first major surface and/or the second major surface and decreases substantially constantly to a point between the first major surface and the second major surface. At that point, the concentration of the metal oxide is the least along the entire thickness t; however the concentration is also non-zero at that point. In other words, the non-zero concentration of that particular metal oxide extends along a substantial portion of the thickness t (as described herein) or the entire thickness t. In some embodiments, the lowest concentration in the particular metal oxide is in the CT region. The total concentration of the particular metal oxide in the strengthened glass substrate may be in the range from about 1 mol % to about 20 mol %.

In one or more embodiments, the strengthened glass substrate includes a first metal oxide concentration and a second metal oxide concentration, such that the first metal oxide concentration is in the range from about 0 mol % to about 15 mol % along a first thickness range from about 0t to about 0.5t, and the second metal oxide concentration is in the range from about 0 mol % to about 10 mol % from a second thickness range from about 0 micrometers to about 25 micrometers (or from about 0 micrometers to about 12 micrometers). The strengthened glass substrate may include an optional third metal oxide concentration. The first metal oxide may include $Na_2O$ while the second metal oxide may include K2O.

The concentration of the metal oxide may be determined from a baseline amount of the metal oxide in the glass substrate prior to being modified to include the concentration gradient of such metal oxide.

Suitable glass compositions for use in the glass substrate include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from 9 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises SnO2 in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein.

In one or more embodiments, the cold-bent glass substrate 140 has a curvature (first radius of curvature) that matches the curvature (second radius of curvature) of at least a portion of the display module 150 (or matches the radius of curvature of the curved surface of the base of the vehicle interior system). In one or more embodiments, at least a portion of the display module 150 is curved to approach or match the curvature of the cold-bent glass substrate 140. In one or more embodiments, the display module 150 includes a second glass substrate, a backlight unit and other components, any of which may be flexible or may permanently exhibit a curvature. In some embodiments, the entire display module is curved to a second radius of curvature. In one or more embodiments, the glass substrate 140 is cold-bent to a curvature that approaches or matches the curvature of at least a portion of the display module 150. In one or more embodiments, at least a portion of the display module 150 is cold-bent to a curvature that approaches or matches the curvature of the cold-bent glass substrate 140.

In one or more embodiments, when the first radius of curvature of the glass substrate varies across its area, the first radius of curvature referred to herein is the minimum radius of curvature of the glass substrate. Similarly, in one or more embodiments, when the second radius of curvature of the display module varies across its area, the second radius of curvature referred to herein is the minimum radius of curvature of the display module. In one or more embodiments, the first radius of curvature may be the minimum radius of curvature adjacent to the display module (as described herein) or the touch panel. In one or more embodiment, the location of the first radius of curvature is the same or near the location of the second radius of curvature. In other words, the first radius of curvature of the curved glass substrate is measured at the same or near the same location at which the second radius of curvature is measured on the second glass substrate or the curved surface of the base in terms of width and length. In one or more embodiments, the term "near" when used with reference to the first and second radius of curvature means the first radius of curvature and the second radius of curvature are measured at locations within a distance of 10 cm, 5 cm, or 2 cm from one another.

In one or more embodiments, the glass substrate 140 has a first radius of curvature of about 20 mm or greater, 40 mm or greater, 50 mm or greater, 60 mm or greater, 100 mm or greater, 250 mm or greater or 500 mm or greater. For example, the first radius of curvature may be in a range from about 20 mm to about 1500 mm, from about 30 mm to about 1500 mm, from about 40 mm to about 1500 mm, from about 50 mm to about 1500 mm, 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 950 mm to about 1500 mm, from about 1000 mm to about 1500 mm, from about 1250 mm to about 1500 mm, from about 20 mm to about 1400 mm, from about 20 mm to about 1300 mm, from about 20 mm to about 1200 mm, from about 20 mm to about 1100 mm, from about 20 mm to about 1000 mm, from about 20 mm to about 950 mm, from about 20 mm to about 900 mm, from about 20 mm to about 850 mm, from about 20 mm to about 800 mm, from about 20 mm to about 750 mm, from about 20 mm to about 700 mm, from about 20 mm to about 650 mm, from about 20 mm to about 200 mm, from about 20 mm to about 550 mm, from about 20 mm to about 500 mm, from about 20 mm to about 450 mm, from about 20 mm to about 400 mm, from about 20 mm to about 350 mm, from about 20 mm to about 300 mm, from about 20 mm to about 250 mm, from about 20 mm to about 200 mm, from about 20 mm to about 150 mm, from about 20 mm to about 100 mm, from about 20 mm to about 50 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm. In one or more embodiments, glass substrates having a thickness of less than about 0.4 mm may exhibit a radius of curvature that is less than about 100 mm, or less than about 60 mm.

In one or more embodiments, the display module 150 (or the curved surface of the base of the vehicle interior system) has a second radius of curvature of about 20 mm or greater, 40 mm or greater, 50 mm or greater, 60 mm or greater, 100 mm or greater, 250 mm or greater or 500 mm or greater. For example, the second radius of curvature may be in a range from about 20 mm to about 1500 mm, from about 30 mm to about 1500 mm, from about 40 mm to about 1500 mm, from about 50 mm to about 1500 mm, 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 950 mm to about 1500 mm, from about 1000 mm to about 1500 mm, from about 1250 mm to about 1500 mm, from about 20 mm to about 1400 mm, from about 20 mm to about 1300 mm, from about 20 mm to about 1200 mm, from about 20 mm to about 1100 mm, from about 20 mm to about 1000 mm, from about 20 mm to about 950 mm, from about 20 mm to about 900 mm, from about 20 mm to about 850 mm, from about 20 mm to about 800 mm, from about 20 mm to about 750 mm, from about 20 mm to about 700 mm, from about 20 mm to about 650 mm, from about 20 mm to about 200 mm, from about 20 mm to about 550 mm, from about 20 mm to about 500 mm, from about 20 mm to about 450 mm, from about 20 mm to about 400 mm, from about 20 mm to about 350 mm, from about 20 mm to about 300 mm, from about 20 mm to about 250 mm, from about 20 mm to about 200 mm, from about 20 mm to about 150 mm, from about 20 mm to about 100 mm, from about 20 mm to about 50 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm. In one or more embodiments, glass substrates having a thickness of less than about 0.4 mm may exhibit a radius of curvature that is less than about 100 mm, or less than about 60 mm.

In one or more embodiments, the glass substrate is cold-bent to exhibit a first radius curvature that is within 10% (e.g., about 10% or less, about 9% or less, about 8% or less, about 7% or less, about 6% or less, or about 5% or less) of the second radius of curvature of the display module 150

(or the curved surface of the base of the vehicle interior system). For example, if the display module 150 (or the curved surface of the base of the vehicle interior system) exhibits a radius of curvature of 1000 mmm, the glass substrate is cold-bent to have a radius of curvature in a range from about 900 mm to about 1100 mm.

Figure 5:
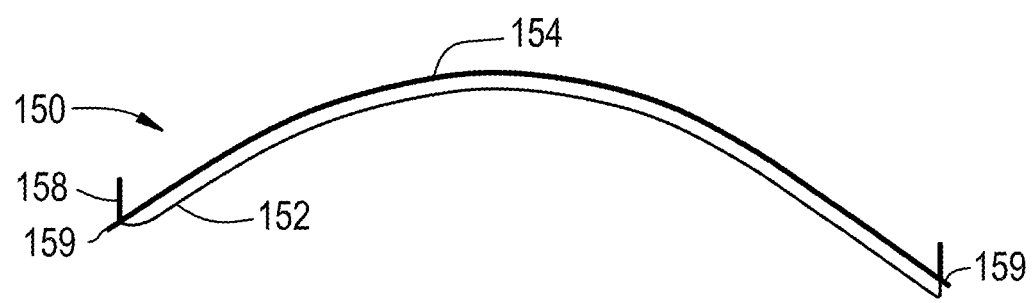
FIG. 5 is a detailed view illustration of an embodiment of the display module of FIG. 2.
Figure 6:
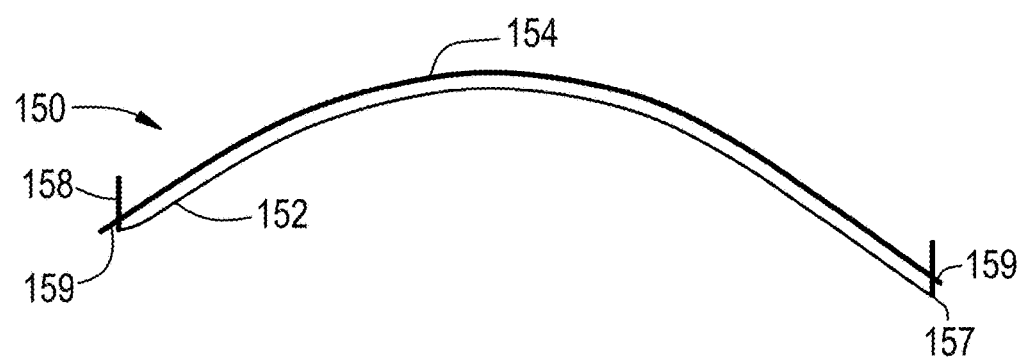
FIG. 6 is a detailed view illustration of an alternative embodiment of a display module.
Figure 7:
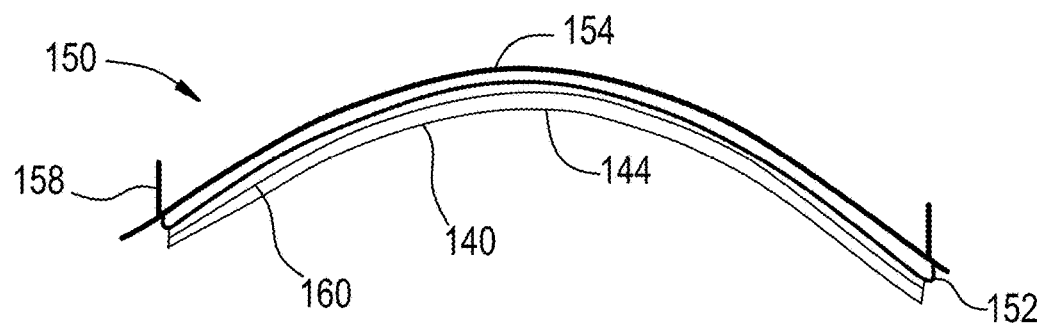
FIG. 7 is a detailed view illustration of the display of FIG. 2.

In one or more embodiments, the display module 150 as shown in FIG. 5 and includes a second glass substrate 152 and a backlight unit 154. As shown in FIG. 6 and FIG. 7, the second glass substrate is disposed adjacent the first major surface 142 of the glass substrate. Accordingly, the second glass substrate 152 is disposed between the backlight unit 154 and the first major surface 142. In the embodiment shown, the backlight unit 154 is optionally curved to exhibit the second radius of curvature of the display module 150. In one or more embodiments, the backlight unit 154 may be flexible to curve to the second radius of curvature. In one or more embodiments, the second glass substrate 152 may be curved to the second radius of curvature. In one or more specific embodiments, the second glass substrate may be cold-bent to exhibit the second radius of curvature. In such embodiments, the second radius of curvature is measured on the surface of the second glass substrate 152 adjacent the glass substrate 140. In one or more embodiments, the display module 150 (including any one or more of the backlight unit, the second glass substrate, and the frame) are permanently curved to the second radius of curvature of the display module 150. In one or more embodiments, the second glass substrate may be cold-bent before or during lamination. The backlight unit may be attached to the curved glass substrate, the second glass substrate and/or the frame (as described herein) via an adhesive (as described herein) or by mechanical means (e.g., screws, clamps, clips and the like) known in the art.

In one or more embodiments, the second glass substrate may have a thickness greater than the thickness of the glass substrate. In one or more embodiments, the thickness is greater than 1 mm, or about 1.5 mm or greater. In one or more embodiments, the thickness of the second glass substrate may have a thickness that is substantially the same as the glass substrate. In one or more embodiments, the second glass substrate has a thickness in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

The second glass substrate may have the same glass composition as the glass substrate 140 or may differ from the glass composition used for the glass substrate 140. In one or more embodiments, the second glass substrate may have an alkali-free glass composition. Suitable glass compositions for use in the second glass substrate may include soda lime glass, alkali-free aluminosilicate glass, alkali-free borosilicate glass, alkali-free boroaluminosilicate glass, alkali-containing aluminosilicate glass, alkali-containing borosilicate glass, and alkali-containing boroaluminosilicate glass. In one or more embodiments, the second glass substrate may be strengthened (as disclosed herein with respect to the glass substrate 140). In some embodiments, the second glass substrate is unstrengthened or strengthened only by mechanical and/or thermal strengthening (i.e., not strengthened by chemical strengthening). In some embodiments, the second glass substrate may be annealed.

In one or more embodiments, the display comprises an organic light-emitting diode (OLED) display. In such embodiments, the first radius of curvature of the glass substrate is within 10% of the second radius of curvature of the OLED display or the curved surface on which it is assembled (such as the base).

In one or more embodiments, the display module 150 includes a frame 158. In the embodiment shown, the frame 158 is positioned between the backlight unit 154 and the second glass substrate 152. The frame may include flanges 159 extending outward from the display module 150 forming an "L" shape with respect to the frame. In one or more embodiments, the frame 158 at least partially surrounds the backlight unit 154. In one or more embodiments as shown in FIG. 6, the frame at least partially surrounds the second glass substrate 152. In one or more embodiments in which the display module comprises an OLED display, the OLED structure is between the frame and the glass substrate.

In one or more embodiments, the frame 158 is associated or assembled with the glass substrate 140, the second glass substrate 152 or another component of the display module in the case of OLED displays. In one or more embodiments, the frame can either at least partially surrounds the minor surface 146 of the glass substrate 140 or the minor surface of the glass substrate may not be surrounded by the frame. In other words, the frame may include secondary flanges 157 that extend to partially surround the second glass substrate 152, the minor surface of the glass substrate 140, and/or another component of the display module in the case of OLED displays.

In one or more embodiments, the frame 158 includes one or more snap-in features or other features that enable easy and quick installation of the display module 150 in the vehicle interiors. Specifically, the snap-in features or other similar features can be used to assemble the display module with a center console base 110 with a curved surface 120, a dashboard base 210 with a curved surface 220 or a steering wheel base 310 with a curved surface 320. In one or more embodiments, the snap-in features could be added separately on the frame or may be integral to the frame. The snap-in features could include various snap-in joints such as cantilever, torsion, annular, and the like that engage with a corresponding component after assembly. Such snap-in joints can include a first component including a protruding part (such as hook, stud, etc.) that is deflected briefly during the joining process with the vehicle interior and mates with a second component including an opening or depression disposed on the vehicle interior system. After the installation process, the protruding part returns to a stress-free state.

Figure 20A:
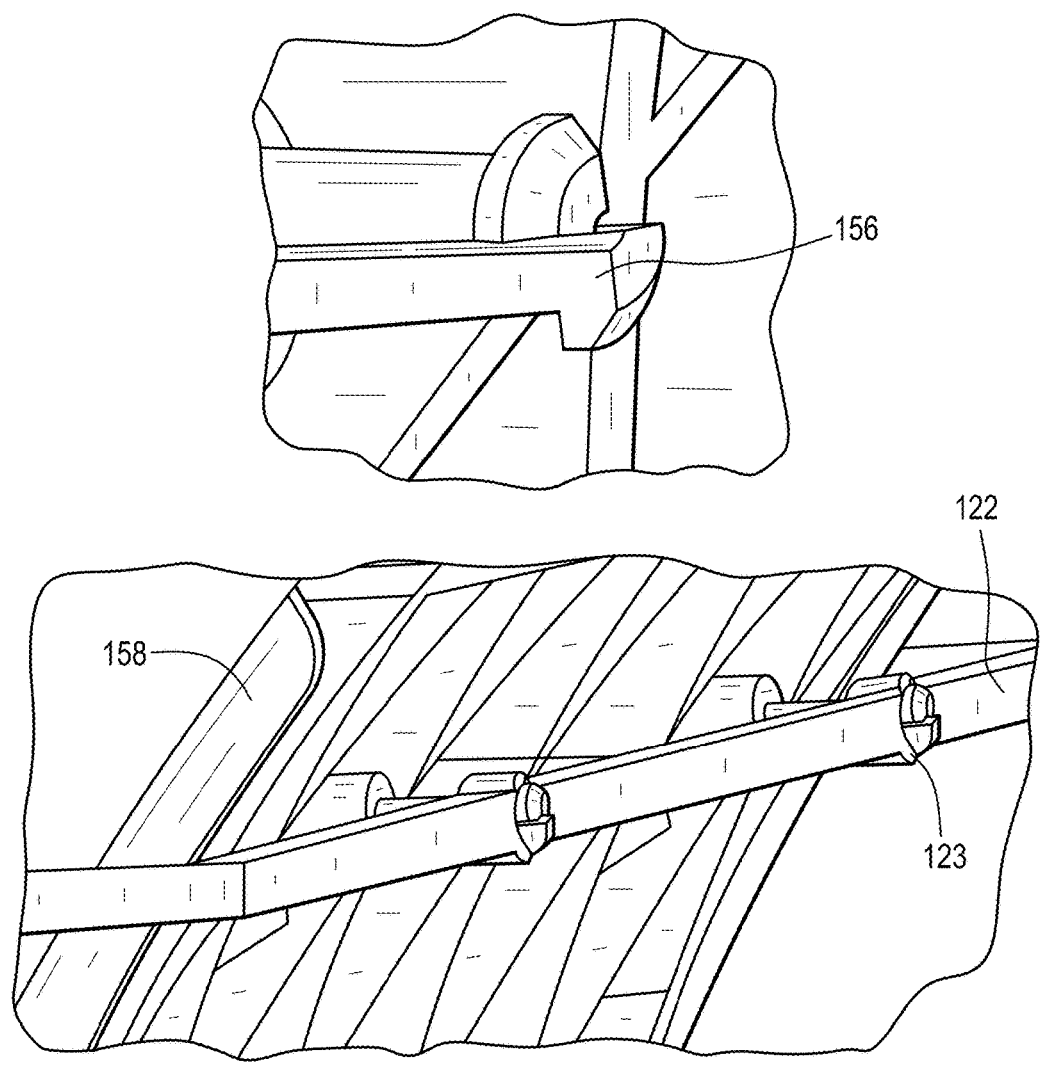
FIG. 20A shows a perspective view of a snap-in feature of a frame.

An exemplary frame 158 is shown in FIG. 20A. In FIG. 20A, the frame 158 includes a first component 156 in the form of a protruding part (specifically a cantilever snap-fit joint) and a center console base 110 with a curved surface 120 that includes a second portion 122, in the form of an opening 123, that mates with the first component. In FIGS.

Figure 20D:
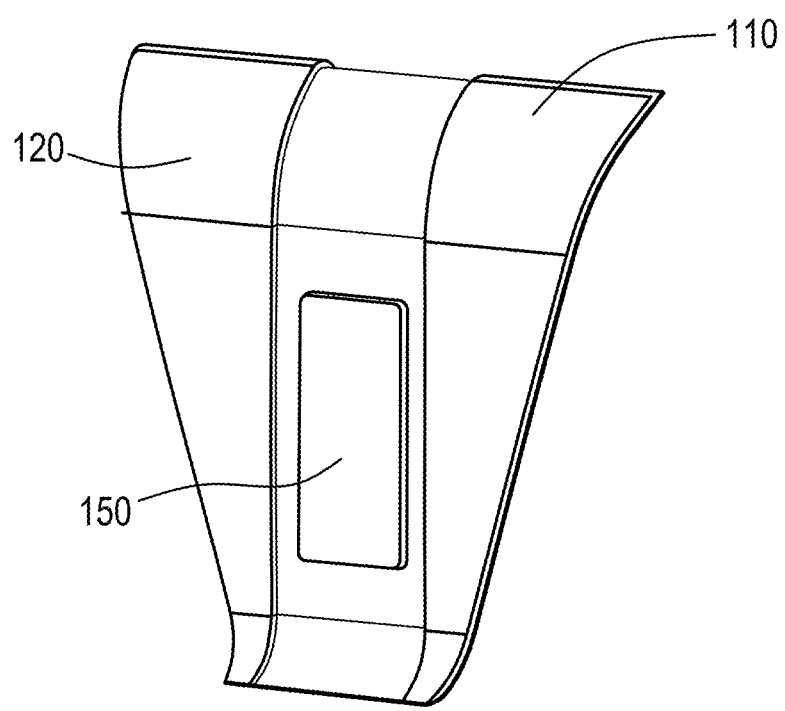
FIG. 20D shows the assembled frame and vehicle interior system of FIGS. 20B and 20C.

20B and 20C, the display module 150 includes the frame 158 with the first component 156 and the center console base 110 with the curved surface 120 and second portion 122 before assembly. FIG. 20D shows the display module 150 and center console base 110 after assembly. Such embodiments of the frame that permit ease of assembly without the use of additional parts and reduce the time for assembly and related process cost. The frame may be fabricated using an injection molding process in which the first component (and the snap-in features) is incorporated in the die. In one or more embodiments, the frame may be used to enable an after-market display module that can be assembled to various vehicle interiors.

In one or more embodiments, the display includes an adhesive or adhesive layer 160 between the glass substrate 140 and the display module 150. The adhesive may be optically clear. In some embodiments, the adhesive is disposed on a portion of the glass substrate 140 and/or the display module 150. For example, as shown in FIG. 4, the glass substrate may include a periphery 147 adjacent the minor surface 146 defining an interior portion 148 and the adhesive may be disposed on at least a portion of the periphery. The thickness of the adhesive may be tailored to ensure lamination between the display module 150 (and more particularly the second glass substrate) and the glass substrate 140. For example, the adhesive may have a thickness of about 1 mm or less. In some embodiments, the adhesive has a thickness in a range from about 200 μm to about 500 μm, from about 225 μm to about 500 μm, from about 250 μm to about 500 μm, from about 275 μm to about 500 μm, from about 300 μm to about 500 μm, from about 325 μm to about 500 μm, from about 350 μm to about 500 μm, from about 375 μm to about 500 μm, from about 400 μm to about 500 μm, from about 200 μm to about 475 μm, from about 200 μm to about 450 μm, from about 200 μm to about 425 μm, from about 200 μm to about 400 μm, from about 200 μm to about 375 μm, from about 200 μm to about 350 μm, from about 200 μm to about 325 μm, from about 200 μm to about 300 μm, or from about 225 μm to about 275 μm.

In one or more embodiments, the either one of or both the first major surface 142 and the second major surface 144 of the glass substrate includes a surface treatment. The surface treatment may cover at least a portion of the first major surface 142 and the second major surface 144. Exemplary surface treatments include an easy-to-clean surface, an anti-glare surface, an anti-reflective surface, a haptic surface, and a decorative surface. In one or more embodiments, the at least a portion of the first major surface and 142/or the second major surface 144 may include any one, any two or all three of an anti-glare surface, an anti-reflective surface, a haptic surface, and a decorative surface. For example, first major surface 142 may include an anti-glare surface and the second major surface 144 may include an anti-reflective surface. In another example, the first major surface 142 includes an anti-reflective surface and the second major surface 144 includes an anti-glare surface. In yet another example, the first major surface 142 comprises either one of or both the anti-glare surface and the anti-reflective surface, and the second major surface 144 includes the decorative surface.

The anti-reflective surface may be formed using an etching process and may exhibit a transmission haze 20% or less (e.g., about 15% or less, or about 10% or less), and a distinctiveness of image (DOI) of about 80 or less. As used herein, the terms "transmission haze" and "haze" refer to the percentage of transmitted light scattered outside an angular cone of about ±2.5° in accordance with ASTM procedure D1003. For an optically smooth surface, transmission haze is generally near zero. As used herein, the term "distinctness of image" is defined by method A of ASTM procedure D5767 (ASTM 5767), entitled "Standard Test Methods for Instrumental Measurements of Distinctness-of-Image Gloss of Coating Surfaces," the contents of which are incorporated herein by reference in their entirety. In accordance with method A of ASTM 5767, substrate reflectance factor measurements are made on the anti-glare surface at the specular viewing angle and at an angle slightly off the specular viewing angle. The values obtained from these measurements are combined to provide a DOI value. In particular, DOI is calculated according to the equation $$DOI = \left[1 - \frac{Ros}{Rs}\right] \times 100, \quad (1)$$

where Ros is the relative reflection intensity average between 0.2° and 0.4 away from the specular reflection direction, and Rs is the relative reflection intensity average in the specular direction (between +0.05° and −0.05°, centered around the specular reflection direction). If the input light source angle is +20° from the sample surface normal (as it is throughout this disclosure), and the surface normal to the sample is taken as 0°, then the measurement of specular reflected light Rs is taken as an average in the range of about −19.95° to −20.05°, and Ros is taken as the average reflected intensity in the range of about −20.2° to −20.4° (or from −19.6° to −19.8°, or an average of both of these two ranges). As used herein, DOI values should be directly interpreted as specifying a target ratio of Ros/Rs as defined herein. In some embodiments, the anti-glare surface has a reflected scattering profile such that >95% of the reflected optical power is contained within a cone of +/−10°, where the cone is centered around the specular reflection direction for any input angle.

The resulting the anti-glare surface may include a textured surface with plurality of concave features having an opening facing outwardly from the surface. The opening may have an average cross-sectional dimension of about 30 micrometers or less. In one or more embodiments, the anti-glare surface exhibits low sparkle (in terms of low pixel power deviation reference or PPDr) such as PPDr of about 6% or less, As used herein, the terms "pixel power deviation referenced" and "PPDr" refer to the quantitative measurement for display sparkle. Unless otherwise specified, PPDr is measured using a display arrangement that includes an edge-lit liquid crystal display screen (twisted nematic liquid crystal display) having a native sub-pixel pitch of 60 μm×180 μm and a sub-pixel opening window size of about 44 μm×about 142 μm. The front surface of the liquid crystal display screen had a glossy, anti-reflection type linear polarizer film. To determine PPDr of a display system or an anti-glare surface that forms a portion of a display system, a screen is placed in the focal region of an "eye-simulator" camera, which approximates the parameters of the eye of a human observer. As such, the camera system includes an aperture (or "pupil aperture") that is inserted into the optical path to adjust the collection angle of light, and thus approximate the aperture of the pupil of the human eye. In the PPDr measurements described herein, the iris diaphragm subtends an angle of 18 milliradians.

The anti-reflective surface may be formed by a multilayer coating stack formed from alternating layers of a high refractive index material and a low refractive index material.

Such coatings stacks may include 6 layers or more. In one or more embodiment, the anti-reflective surface may exhibit a single-side average light reflectance of about 2% or less (e.g., about 1.5% or less, about 1% or less, about 0.75% or less, about 0.5% or less, or about 0.25% or less) over the optical wavelength regime in the range from about 400 nm to about 800 nm. The average reflectance is measured at an incident illumination angle greater than about 0 degrees to less than about 10 degrees.

The decorative surface may include any aesthetic design formed from a pigment (e.g., ink, paint and the like) and can include a wood-grain design, a brushed metal design, a graphic design, a portrait, or a logo. In one or more embodiments, the decorative surface exhibits a deadfront effect in which the decorative surface disguises or masks the underlying display from a viewer when the display is turned off but permits the display to be viewed when the display is turned on. The decorative surface may be printed onto the glass substrate. In one or more embodiments, the anti-glare surface includes an etched surface. In one or more embodiments, the anti-reflective surface includes a multi-layer coating. In one or more embodiments, the easy-to-clean surface includes an oleophobic coating that imparts anti-fingerprint properties. In one or more embodiments, the haptic surface includes a raised or recessed surface formed from depositing a polymer or glass material on the surface to provide a user with tactile feedback when touched.

In one or more embodiments, the surface treatment (i.e., the easy-to-clean surface, the anti-glare surface, the anti-reflective surface, the haptic surface and/or the decorative surface) is disposed on at least a portion of the periphery 147 and the interior portion 148 is substantially free of the surface treatment.

In one or more embodiments, the display module includes touch functionality and such functionality is accessible through the glass substrate 140. In one or more embodiments, displayed images or content shown by the display module is visible through the glass substrate 140.

A second aspect of this disclosure pertains to various methods and systems for cold-bending a glass substrate, such as substrate 140, and/or forming a display. In various embodiments, the methods and systems discussed herein utilize air pressure differentials to cause bending of the glass substrate. As noted above, these systems and methods bend the glass substrate without use of the high temperatures (e.g., temperatures greater than the glass softening point) that are typical with hot-bending/hot-forming processes.

Figure 8:
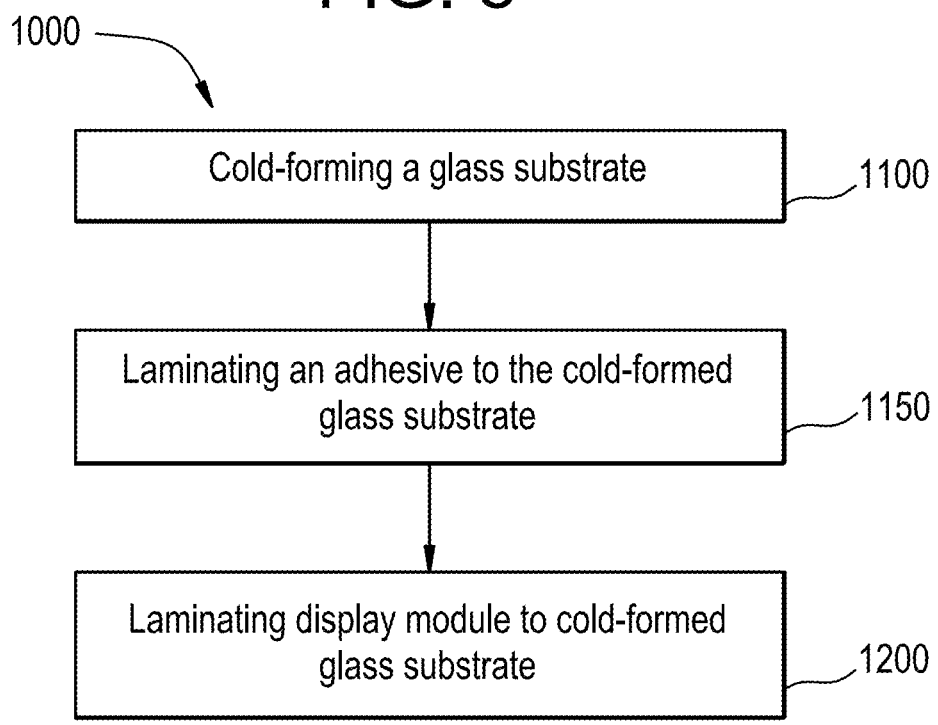
FIG. 8 is a process flow diagram of a method for forming the display according to one or more embodiments.
Figure 9:
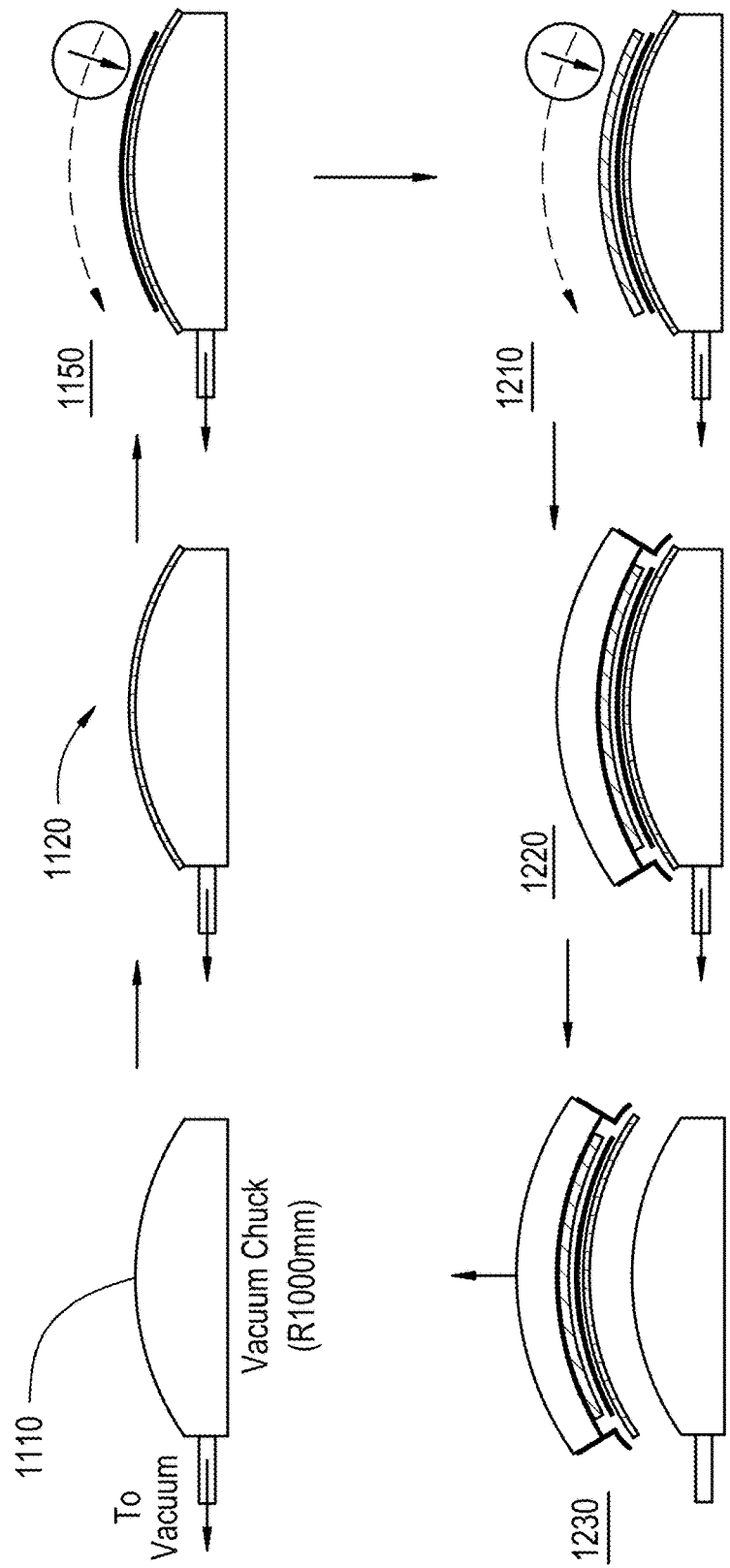
FIG. 9 is an illustration of the method described in FIG. 8.

Referring to FIGS. 8 and 9, a method 1000 of forming a display is shown according to exemplary embodiments. In one or more embodiments, the method includes a step 1100 of cold-bending a glass substrate, such as substrate 140, to a first radius of curvature (as described herein), and laminating a display module 150 to the first one of the major surfaces 142 or 144 (see FIGS. 2 and 3) while maintaining the first radius of curvature in the glass substrate to form the display. In one or more embodiments, the display module has a second radius of curvature (as described herein) that is within 10% of the first radius of curvature. As shown in FIG. 9, in one or more embodiments, cold-bending the glass substrate 140 includes applying a vacuum to the second major surface 144 of the glass substrate to generate the first radius of curvature 1120. Accordingly, in the embodiment shown in FIG. 9, applying the vacuum includes placing the glass substrate on a vacuum fixture 1110 before applying the vacuum to the second major surface. In one or more embodiments, to maintain the first radius of curvature, the glass substrate and subsequent assembly with the display module (steps 1150, 1200) is performed while the vacuum is applied to the glass substrate to cold-bend the glass substrate to the first radius of curvature. In other words, the glass substrate 140 is temporarily cold-bent by applying the vacuum, and subsequent lamination with the display module 150 permanently cold-bends the glass substrate and forms the display. In such embodiments, the display module provides the rigidity needed to permanently cold-bend the glass substrate. Other mechanisms to temporarily cold-bend the glass substrate may be used. For example, the glass substrate may be temporarily affixed to a mold having the desired curvature to cold-bend the glass substrate. The glass substrate may be temporarily affixed by a pressure sensitive adhesive or other mechanism.

After cold-bending the glass substrate, the method of one or more embodiments includes laminating an adhesive to the first major surface 142 of the glass substrate 140 before laminating the display module to the first major surface such that the adhesive is disposed between the first major surface and the display module. In one or more embodiments, laminating the adhesive may include applying a layer of the adhesive and then applying a normal force using roller or other mechanism. Exemplary examples include any suitable optically clear adhesive for bonding the glass substrate to the second glass substrate of the display module 150. In one example, the adhesive may include an optically clear adhesive available from 3M Corporation under the trade name 8215. The thickness of the adhesive may be in a range as otherwise described herein (e.g., from about 200 μm to about 500 μm).

In one or more embodiment, step 1200 of laminating a display module includes laminating the second glass substrate 152 to the glass substrate 140 (step 1210 in FIG. 9) and then attaching the backlight unit 154 to the second glass substrate (step 1220, in FIG. 9). In one or more embodiments, the method includes cold-bending the second glass substrate during lamination to the glass substrate. In one or more embodiments, the second glass substrate is curved prior to lamination. For example, the second glass substrate may be temporarily curved or cold-bent before lamination to exhibit the second radius of curvature. In another example, the second glass substrate may be permanently curved (by, for example, hot forming) to exhibit the second radius of curvature). In one or more embodiments, the backlight unit is curved to exhibit the second radius of curvature. In one or more embodiments, the backlight unit is flexible and is curved during lamination to the second radius of curvature. In one or more embodiments, the backlight unit may be curved prior to lamination. For example, the backlight unit may be temporarily curved before lamination to exhibit the second radius of curvature. In another example, the backlight unit may be permanently curved to exhibit the second radius of curvature).

In one or more embodiments, step 1220 includes attaching a frame to one of the backlight unit and the second glass substrate. In one or more embodiments, the method includes step 1230 of removing the vacuum from the second major surface of glass substrate 140. For example, removing the vacuum from the second major surface may include removing the display from the vacuum fixture.

In one or more embodiments, the method includes disposing or assembling the display in a vehicle interior system 100, 200, 300. Where a frame is used, the frame may be used to assemble the display to a vehicle interior system as otherwise described herein.

Referring to FIGS. 10-15, additional systems and methods for forming a curved glass substrate via cold-bending is shown and described. In the specific embodiments shown and described, the curved glass substrate is utilized as a cover glass in vehicle interior system 100, 200, 300. It should be understood that any of the glass substrate, frame, and display module embodiments described herein may be formed or utilized in the processes and systems discussed in relation to FIGS. 10-15.

Referring to FIG. 10, a method 1300 for cold-bending a glass substrate is shown. At step 1310, a glass substrate, such as glass substrate 140, is supported and/or placed on a curved frame. The frame may be a frame of a display, such as frame 158 (as described herein) that defines a perimeter and curved shape for a vehicle display. In general, the curved frame includes a curved support surface and one of the major surfaces 142 or 144 of glass substrate 140 is placed into contact with the curved support surface of the frame.

At step 1320, an air pressure differential is applied to the glass substrate while it is supported by the frame causing the glass substrate to bend into conformity with the curved shape of the curved support surface of the frame. In this manner, a curved glass substrate is formed from a generally flat glass substrate (see FIGS. 3 and 4). In this arrangement, curving the flat piece of glass material forms a curved shape on the major surface facing the frame, while also causing a corresponding (but complimentary) curve to form in the major surface of the glass substrate opposite of the frame. Applicant has found that by bending the glass substrate directly on the curved frame, the need for a separate curved die or mold (typically needed in other glass bending processes) is eliminated. Further, Applicant has found that by shaping the glass substrate directly to the curved frame, a wide range of glass radii may be achieved in a low complexity manufacturing process.

In some embodiments, the air pressure differential may be generated by a vacuum fixture, such as fixture 1110. In some other embodiments, the air pressure differential is formed by applying a vacuum to an airtight enclosure surrounding the frame and the glass substrate. In specific embodiments, the airtight enclosure is a flexible polymer shell, such as a plastic bag or pouch. In other embodiments, the air pressure differential is formed by generating increased air pressure around the glass substrate and the frame with an overpressure device, such as an autoclave. Applicant has further found that air pressure provides a consistent and highly uniform bending force (as compared to a contact-based bending method) which further leads to a robust manufacturing process.

At step 1330, the temperature of the glass substrate is maintained below the glass softening point of the material of the glass substrate during bending. As such, method 1300 is a cold-bending. In particular embodiments, the temperature of the glass substrate is maintained below 500° C., 400° C., 300° C., 200° C. or 100° C. In a particular embodiment, the glass substrate is maintained at or below room temperature during bending. In a particular embodiment, the glass substrate is not actively heated via a heating element, furnace, oven, etc. during bending, as is the case when hot-forming glass to a curved shape.

As noted above, in addition to providing processing advantages such as eliminating expensive and/or slow heating steps, the cold-bending processes discussed herein are believed to generate curved glass substrates with a variety of properties that are superior to hot-formed glass substrates, particularly for display cover glass applications. For example, Applicant believes that, for at least some glass materials, heating during hot-forming processes decreases optical properties of curved glass substrates, and thus, the curved glass substrates formed utilizing the cold-bending processes/systems discussed herein provide for both curved glass shape along with improved optical qualities not believed achievable with hot-bending processes.

Further, many glass coating materials (e.g., anti-reflective coatings) are applied via deposition processes, such as sputtering processes that are typically ill-suited for coating curved glass articles. In addition, many coating materials also are not able to survive the high temperatures associated with hot-bending processes. Thus, in particular embodiments discussed herein, one or more coating material is applied to major surface 142 and/or to major surface 144 of glass substrate 140 prior to cold-bending (when the glass substrate is flat), and the coated glass substrate is bent to a curved shape as discussed herein. Thus, Applicant believes that the processes and systems discussed herein allow for bending of glass after one or more coating material has been applied to the glass, in contrast to typical hot-forming processes.

Referring to FIG. 11, a process 1400 for forming a display is shown. At step 1410 an adhesive material is applied between a curved support surface of the frame and first major surface 142 of glass substrate 140. In a particular embodiment, the adhesive is placed first onto the frame support surface, and then at step 1420, glass substrate 140 is placed onto the adhesive coated frame. In another embodiment, the adhesive may be placed onto first major surface 142 which is then placed into contact with the support surface of the frame.

The adhesive material may be applied in a variety ways. In one embodiment, the adhesive is applied using an applicator gun and mixing nozzle or premixed syringes, and spread uniformly using any of the following, for example, a roller, a brush, a doctor blade or a draw down bar. In various embodiments, the adhesives discussed herein are structural adhesives. In particular embodiments, the structural adhesives may include, but not limited to, an adhesive selected from one of more of the categories: (a) Toughened Epoxy (for example, Masterbond EP21TDCHT-LO, 3M Scotch Weld Epoxy DP460 Off-white); (b) Flexible Epoxy (for example, Masterbond EP21TDC-2LO, 3M Scotch Weld Epoxy 2216); (c) Acrylics and/or Toughened Acrylics (for example, LORD Adhesive 403, 406 or 410 Acrylic adhesives with LORD Accelerator 19 or 19 GB w/LORD AP 134 primer, LORD Adhesive 850 or 852/LORD Accelerator 25 GB, Loctite HF8000, Loctite AA4800); (d) Urethanes (for example, 3M Scotch Weld Urethane DP640 Brown, Sikaflex 552 and Polyurethane (PUR) Hot Melt adhesives such as, Technomelt PUR 9622-02 UVNA, Loctite HHD 3542, Loctite HHD 3580, 3M Hotmelt adhesives 3764 and 3748); and (e) Silicones (Dow Corning 995, Dow Corning 3-0500 Silicone Assembly adhesive, Dow Corning 7091, SikaSil-GP). In some cases, structural adhesives available as sheets or films (for example, but not limited to, 3M Structural adhesive films AF126-2, AF 163-2M, SBT 9263 and 9214, Masterbond FLM36-LO) may be utilized. Furthermore, pressure sensitive structural adhesives such as 3M VHB tapes may be utilized. In such embodiments, utilizing a pressure sensitive adhesive allows for the curved glass substrate to be bonded to the frame without the need for a curing step.

At step 1420, a variety of different techniques or mechanisms can be utilized to align the glass substrate with the frame. For example, tabs, markings and clamps can be utilized to align the glass substrate with the frame support surface.

At step 1430, an air pressure differential is applied to cause glass substrate 140 to bend into conformance with the shape of curved support surface of the curved frame, as discussed above regarding step 1320. At step 1440, the now curved glass substrate is bonded to the curved frame support surface via the adhesive. Because the air pressure does not permanently deform the glass substrate, the bonding step occurs during application of the air pressure differential. In various embodiments, the air pressure differential is between 0.5 and 1.5 atmospheres of pressure (atm), specifically between 0.7 and 1.1 atm, and more specifically is 0.8 to 1 atm.

Performance of step 1440 is based upon the type of adhesive used to create the bond between the glass substrate and the frame. For example, in embodiments where increasing the temperature will accelerate the cure of the adhesive, heat is applied to cure the adhesive. In one such embodiment, the heat-curable adhesive is cured by raising the temperature to the cure temperature of the adhesive but lower than the glass softening point of the glass substrate, while the glass substrate is held bent in conformance with the shape of curved support surface of the curved frame via the pressure differential. In a specific embodiment, the heat may be applied using an oven or a furnace. In another embodiment, both heat and pressure may be applied via an overpressure device, such as an autoclave.

In embodiments where the adhesive is a UV-curable adhesive, UV light is applied to cure the adhesive. In other embodiments, the adhesive is a pressure sensitive adhesive, pressure is applied to bond the adhesive between the glass substrate and the frame. In various embodiments, regardless of the process by which the bond between the glass substrate and the frame is formed, the adhesive may be an optically clear adhesive, such as a liquid optically clear adhesive.

At step 1450, a display module, such as display module 150, is attached to the frame supporting the now curved and bonded glass substrate. In specific embodiments, the glass substrate-frame assembly may be removed from the device applying the pressure differential, prior to attachment of the display module to the frame. In a specific embodiment, the display module is attached to the frame via an adhesive such as an optically clear adhesive. In other embodiments, the display module may be attached to the frame by a variety of mechanical coupling devices, such as screws, snap-in or snap-fit components, etc. In a specific embodiment, a liquid optically clear adhesive (LOCA) available from E3 Display at thickness of 125 µm is applied to bond the display module to the frame and then the adhesive is UV cured to obtain the assembled part.

FIG. 12 shows a graphical representation of process 1400 including additional steps according to an exemplary embodiment. At step 1425, the glass substrate supported on the frame is positioned within an airtight enclosure, shown as plastic vacuum bag 1426. In a specific embodiment, a breather cloth is placed on the frame 158/glass substrate 140 to provide connectivity of the part surface to the vacuum port. Additionally, the breather cloth helps in absorbing excess glue that may ooze out of the part during the process.

Then at step 1430 a vacuum is drawn within vacuum bag 1426. At step 1440, the vacuum bag 1426 with the glass substrate and frame are positioned within an autoclave 1442 which generates heat to cure the adhesive bonding the glass substrate to the frame. In a specific embodiment, vacuum bag 1426 is placed in the autoclave at 66 degrees C./90 psi for 1 hour duration to cure the adhesive. At step 1460, following display module attachment at step 1450, an assembled display assembly 1470 including the glass substrate (e.g., cover glass), display frame, and display module is completed with all parts attached together and is ready for mounting in a vehicle interior.

Figure 13:
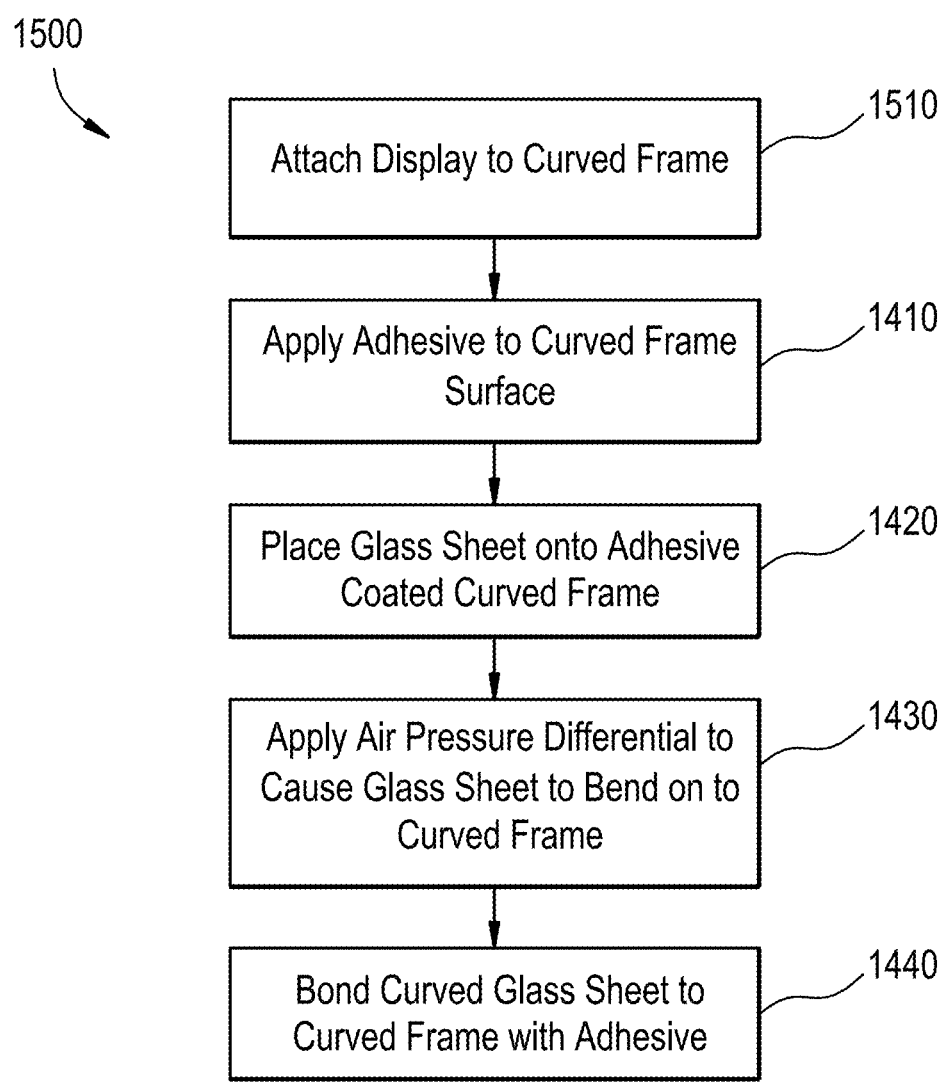
FIG. 13 is a flow diagram of a process for forming a display, according to another exemplary embodiment.

Referring to FIG. 13, a process 1500 for forming a display is shown according to another embodiment. Process 1500 is substantially the same as process 1400, except as discussed herein. Rather than attach the display module to the frame following bending and following attachment of the glass substrate to the frame, process 1500 attaches the display module to the frame beforehand, at step 1510. In some such embodiments, the display module is bonded to frame via an adhesive that is cured during the same cure step that bonds the glass substrate to the frame. In such embodiments, the display module is bonded to the frame during application of the air pressure differential that causes the bending of glass substrate to the frame.

Figure 14:
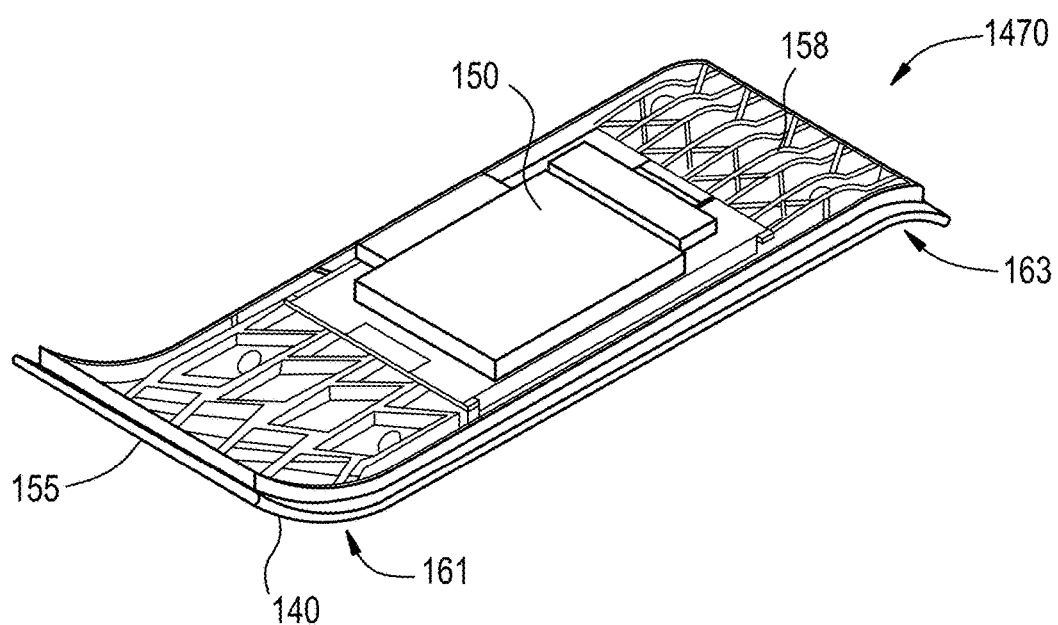
FIG. 14 is a perspective view of a display, according to an exemplary embodiment.
Figure 15:
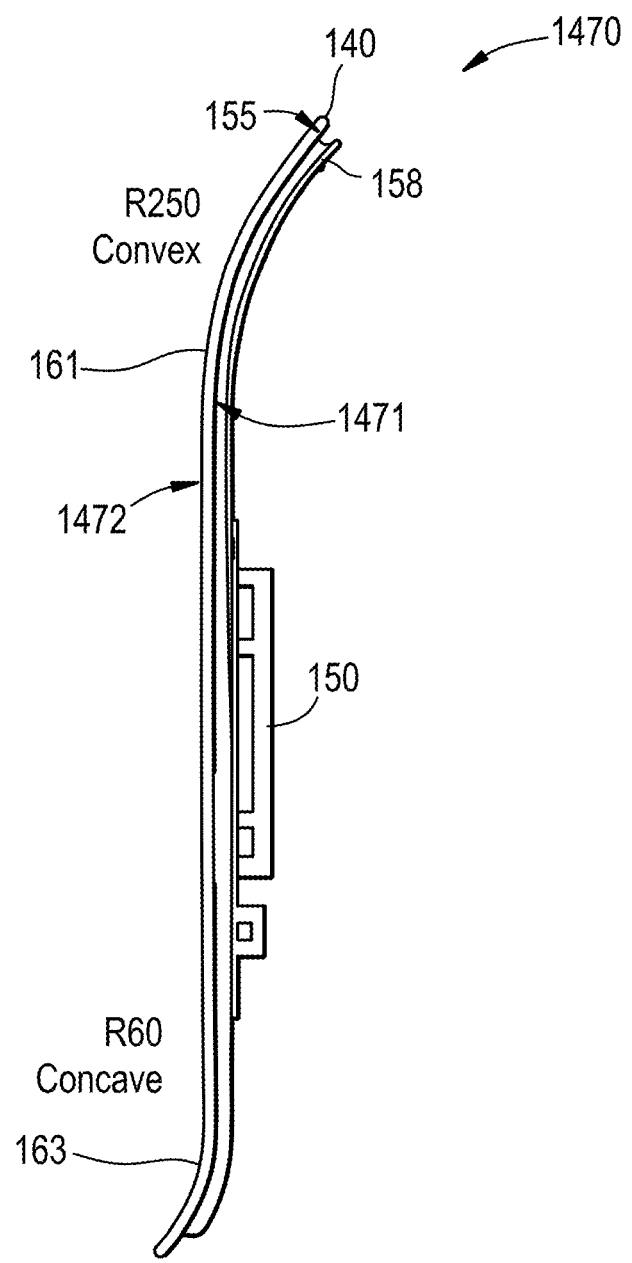
FIG. 15 is a side view of the display of FIG. 14, according to an exemplary embodiment.

Referring to FIGS. 14 and 15, display assembly 1470 is shown according to an exemplary embodiment. In the embodiment shown, the display assembly includes frame 158 supporting both a display module 150 and a cover glass substrate such as glass substrate 140. As shown in FIGS. 14 and 15, both display module 150 and glass substrate 140 are coupled to frame 158, and display module 150 is positioned to allow a user to view display module 150 through glass substrate 140. In various embodiments, frame 158 may be formed from a variety of materials that include, but not limited to plastics such as polycarbonate (PC), polypropylene (PP), Acrylonitrile-Butadiene-Styrene (ABS), PC/ABS blends, etc.), metals (Al-alloys, Mg-alloys, Fe-alloys, etc.), glass-filled resins, fiber reinforced plastics and fiber reinforced composites. Various processes such as casting, machining, stamping, injection molding, extrusion, pultrusion, resin transfer molding etc. may be utilized to form the curved shape of frame 158.

In another example, toughened epoxy adhesive (supplied by 3M under the tradename 3M Scotch Weld Epoxy DP460 Off-white) was applied to a major surface of a glass substrate or on a curved frame using an applicator gun and mixing nozzle. A roller or brush was used to spread the adhesive uniformly. The glass substrate and frame were stacked or assembled such that the adhesive layer is between the glass substrate and the frame. A high temperature resistant tape was then applied to temporarily maintain the stack alignment. The stack was then placed in a vacuum bag. In this particular example, a release cloth (optional) was placed over the stack to prevent sticking to the vacuum bag, and then a breather cloth was placed over to provide connectivity of the part surface to the vacuum port, and finally, the stack, release cloth and breather cloth assembly was placed in a vacuum bag. The vacuum bag was then sealed to withstand 760 mm of Hg. The vacuum bag was then deaired by drawing a vacuum during which the glass substrate was bent to conform to the curved shape of frame support surface. The vacuum bag with the curved glass substrate and supporting frame were placed in an autoclave at 66° C./90 pounds per square inch (psi) for 1 hour duration to cure the adhesive. The glass substrate is bonded to the curved frame support surface via the cured adhesive. The autoclave was then cooled down to a temperature below 45° C. before the pressure was released. The curved glass substrate/frame stack was removed from the vacuum bag. The resulting curved glass substrate maintained the curved shape of the frame, with no delamination visible to the naked eye. A display module may be assembled to the stack to provide a display assembly It should be understood that the adhesive may be applied and the cold-bent stack can be assembled with the curing of the adhesive either at room temperature or at elevated temperature or using UV depending on the cure schedule of the particular adhesive. In some embodiments, pressure may be applied, along with heat. In some instances, heat alone is applied to the stack. In one or more embodiments, heat may be applied such that the temperature of the stack is in a range from greater than room temperature (i.e., 23° C.) up to 300° C., from about 25° C. to about 300° C., from about 50° C. to about 300° C., from about 75° C. to about 300° C., from about 100° C. to about 300° C., from about 110° C. to about 300° C., from about 115° C. to about 300° C., from about 120° C. to about 300° C., from about 150° C. to about 300° C., from about 175° C. to about 300° C., from about 200° C. to about 300° C., from about 25° C. to about 250° C., from about 25° C. to about 200° C., from about 25° C. to about 150° C., from about 25° C. to about 125° C., from about 25° C. to about 115° C., from about 25° C. to about 110° C., or from about 25° C. to about 100° C. The stack may be heated to such temperatures for a duration from about 2 seconds to about 24 hours, 10 seconds to about 24 hours, from about 30 seconds to about 24 hours, from about 1 minute to about 24 hours, from about 10 minutes to about 24 hours, from about 15 minutes to about 24 hours, from about 20 minutes to about 24 hours, from about 30 minutes to about 24 hours, from about 1 hour to about 24 hours, from about 1.5 hours to about 24 hours, from about 2 hours to about 24 hours, from about 3 hours to about 24 hours, from about 2 seconds to about 4.5 hours, from about 2 seconds to about 4 hours, from about 2 seconds to about 3 hours, from about 2 seconds to about 2 hours, from about 2 seconds to about 1.5 hours, from about 2 seconds to about 1 hour, from about 2 seconds to about 45 minutes, from about 2 seconds to about 30 minutes, from about 2 seconds to about 15 minutes, from about 2 seconds to about 10 minutes, from about 10 minutes to about 45 minutes, or from about 15 minutes to about 45 minutes.

In various embodiments, the systems and methods described herein allow for formation of glass substrate to conform to a wide variety of curved shapes that frame 158 may have. As shown in FIG. 14, frame 158 has a support surface 155 that has a curved shape to which glass substrate 140 is shaped to match. In the specific embodiment shown in FIGS. 14 and 15, support surface 155 includes a convex section 161 and a concave section 163, and glass substrate 140 is shaped to conform to the curved shapes of sections 161 and 163.

As will be generally understood, the opposing first and second major surfaces of glass substrate 140 both form curved shapes as glass substrate is bent to conform to the curved shape of frame support surface 155. Referring to FIG. 15, a first major surface 1471 of glass substrate 140 is the surface in contact with frame support surface 155, and during bending adopts the complementary shape of the frame support surface 155, while an outer, second major surface 1472 of glass substrate 140 adopts a curved shape that generally matches the curved shape of the frame support surface 155. Thus, in this arrangement, second major surface 1472 has a convex section at the position of convex section 161 of frame support surface 155 and has a concave section at the position of concave section 163 of the frame support surface 155. Conversely, first major surface 1471 has a concave section at the position of convex section 161 of the frame support surface 155 and has a convex section at the position of concave section 163 of the frame support surface 155.

In specific embodiments, the radius of curvature of convex curve 161 is 250 mm, and the radius of concave curve 163 is 60 mm. In some embodiments, a non-curved central section is located between the two curved sections. Further, in some embodiments, glass substrate 14 is chemically strengthened aluminosilicate glass with a thickness of 0.4 mm.

It should be understood that FIGS. 14 and 15 provide a specific example of a glass substrate formed with more than one curved section, but in various embodiments, the processes and systems discussed herein can be used to form a wide variety of curved substrates having more or less curved sections than shown in FIGS. 14 and 15. Further, it should be understood that while the exemplary embodiments discussed herein are described primarily in relation to bending display cover glass, glass substrate 140 may be formed for any non-display curved glass application, such as cover glass for an instrument panel in a vehicle.

Referring to FIGS. 16A-16I, another aspect of this disclosure pertains to kits and methods for assembling such kits to provide a display. FIGS. 16A-16I show a cold-bent glass 2010 disposed between a viewer and the display, where the glass substrate has a concave curvature from the viewer's point of view. In one or more embodiments, the curvature may be convex, or may have a combination of convex and concave portions having the same or different radii from one another. Referring to FIGS. 16A-16C, a kit 2000 according to one or more embodiments includes a cold-bent glass substrate 2010 (as described herein according to one or more embodiments) and a frame 2020. In one or more embodiments, the cold-bent glass substrate includes a first major surface 2012, a second major surface 2014 opposing the first major surface and a minor surface 2016 connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width wherein the second major surface 2014 comprises a first radius of curvature. In the embodiments shown in FIGS. 16A-16F, the second major surface forms a concave surface that exhibits a greater compressive stress than the same surface exhibits prior to cold-bending. In some embodiments, the second major surface exhibits a greater compressive stress than the first major surface. The frame 2020 has a curved surface 2022 that is coupled to the second major surface of the cold-bent glass substrate. The frame may be coupled to the glass substrate via an adhesive or mechanical means. In one or more embodiments, the curved surface 2022 may have substantially the same radius of curvature as the first radius of curvature. In one or more embodiments, the curved surface 2022 has the same radius of curvature as the first radius of curvature. The thickness of the cold-bent glass substrate is about 1.5 mm or less. In one or more embodiments, the width of the cold-bent glass substrate is in a range from about 5 cm to about 250 cm, and the length of the cold-bent glass substrate is from about 5 cm to about 250 cm. In one or more embodiments, the first radius of curvature is 500 nm or greater. The glass substrate may be strengthened as described herein.

In one or more embodiments, the kit includes a display module. As shown in the embodiment of FIG. 16B and FIG. 16C, the display module includes a display including a second glass substrate 2030, and an optional backlight unit 2040. In some embodiments, the display module includes only a display (with no backlight unit 2040), as shown in FIG. 16E. In such embodiments, the backlight unit may be provided separately, and attached to the display, as shown in FIG. 16F. In one or more embodiments, the display may be liquid crystal display or an OLED display. In one or more embodiments, the kit may include a touch panel instead of the display module or in addition to the display module (with the touch panel positioned to be disposed between the cold-bent glass substrate and the display module). In the embodiments shown in FIGS. 16B and 16C, the display or touch panel comprises a second glass substrate 2030 that is curved. In such embodiments, the second glass substrate comprises a display surface or curved touch panel surface having a second radius of curvature that is within 10% of the first radius of curvature. In embodiments in which an OLED display is used, the OLED display or the curved surface of the base has a second radius of curvature that is within 10% of the first radius of curvature. In some embodiments, such as shown in FIGS. 16C, 16E, 16F, 16H and 16I, the kit includes an adhesive layer 2050 for attachment of the second glass substrate 2030 to the cold-bent glass substrate or the frame. The adhesive layer may be disposed on the cold-bent glass substrate on the surface thereof to be attached to the second glass substrate. In the embodiment shown in FIGS. 16A-16I, the adhesive layer is disposed on the first major surface). In one or more embodiments, the adhesive layer may be disposed on the second glass substrate or both the cold-bent glass substrate and the second glass substrate. The adhesive 2050 may be an optically clear adhesive, such as the optically clear adhesives described herein. In one or more embodiments, after the cold-bent substrate 2010 and the curved second glass substrate 2030 are laminated, it is believed that such lamination exerts lower stress on any adhesive layer disposed therein. In one or more embodiments, the second radius of curvature may be within 5%, within 4%, within 3% or within 2% of the first radius of curvature. In some embodiments, the cold-bent glass substrate (and corresponding frame) and the second glass substrate are substantially aligned such that less than 2% of the width, less than 2% of the length or less than 2% of both the width and the length of the cold-bent glass is unaligned with the curved second glass substrate (i.e., unaligned portions are exposed), after lamination. In one or more embodiments, less than 5% of the surface area of the first major surface 2012 is unaligned with the second glass substrate or exposed after lamination. In some embodiments, the thickness of the adhesive may be increased to enhance alignment between the cold-bent glass substrate and the second glass substrate.

As shown in FIG. 16C, 16E, 16F, 16H or 16I, the kit may include a second glass substrate that is attached to the first major surface 2012. In one or more embodiments, the second glass substrate is attached to the frame 2020 (not shown). It should be understood that the frame 2020 may have the features of the frame 158 described herein. A shown in the embodiments of FIGS. 16D and 16G, the second glass substrate 2030 is substantially flat and is cold-bendable to a second radius of curvature that is within 10% of the first radius of curvature. As shown in FIGS. 16D through 16F, the second glass substrate may be cold-bent to the second radius of curvature and attached to the cold-bent glass substrate or, optionally, the frame (not shown). In such embodiments, the second glass substrate 2030 or the cold-bent glass substrate 2010 may comprises an adhesive layer to attach the second glass substrate to the cold-bent glass substrate or the frame, as applicable. In one or more particular embodiments, the first major surface 2012 includes an adhesive disposed thereon. In such embodiments, the adhesive may be an optically clear adhesive that is a composite or exhibits different Young's modulus values on the surface in contact with or adjacent the first major surface, than the opposite surface that contacts or will contact the second glass substrate. It is believed that the second glass substrate may exert lower stress on the adhesive layer and thus a lower bending force may be required to cold-bend the second glass substrate to the cold-bent glass substrate. In some such embodiments, the cold-bent glass substrate and the second glass substrate are substantially aligned such that less than 2% of the width, less than 2% of the length or less than 2% of both the width and the length of the cold-bent glass is unaligned with the second glass substrate (i.e., unaligned portions are exposed), after lamination. In one or more embodiments, less than 5% of the surface area of the first major surface 2012 is unaligned with the second glass substrate or exposed after lamination.

As shown in FIGS. 16B-16C and 16F, the backlight unit may be curved. In some embodiments, the backlight unit exhibits a third radius of curvature that is within 10% of the first radius of curvature, within 10% of the second radius of curvature, or within 10% of the first radius of curvature and the second radius of curvature.

In the embodiments shown in FIGS. 16H-16I, the display comprises a second glass substrate that is substantially flat and is attached to the first major surface. In such embodiments, the second glass substrate or the cold-bent glass substrate comprises an adhesive layer 2050 that attaches the second glass substrate to the cold-bent glass substrate (i.e., either directly to the first major surface or a portion of the frame). In such embodiments, the adhesive attaches a cold-bent glass substrate to a flat second glass substrate. A shown, in one or more embodiments, the adhesive layer comprises a first surface that is substantially flat and an opposing second surface having a second radius of curvature that is within the 10% of the first radius of curvature. In such embodiments, the adhesive may be a liquid optically clear adhesive. In some embodiments, the first radius of curvature is in a range from about 500 nm to about 1000 nm.

In one or more embodiments, in the kit shown in FIGS. 16A-16I, an air gap may be present between the second glass substrate and the cold-bent glass substrate (i.e., the first major surface). In one or more embodiments, the adhesive layer may be present on only a portion of the cold-bent glass substrate and/or the second glass substrate such that there is no attachment between a portion of the cold-bent glass substrate and the second glass substrate (as there is no adhesive present to form such attachment).

FIGS. 17A-17I illustrate various embodiments of a kit 3000 that includes a frame 3020 that is removable or is temporarily attached to a cold-bent glass substrate 3010. FIGS. 17A-17I show a convex curvature with the cold-bent glass 3010 disposed between a viewer and the display. In one or more embodiments, the curvature may be concave, or may have a combination of convex and concave portions having the same or different radii from one another. In one or more embodiments, the kit includes a cold-bent glass substrate 3010 comprises a first major surface 3012, a second major surface 3014 opposing the first major surface having a first radius of curvature, and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width, wherein the second major surface comprises a first radius of curvature, and a removable frame 3020 removably coupled to the second major surface. It should be understood that the frame 3020 may have the features of the frame 158 described herein. In one or more embodiments, the frame has a curved surface that is coupled to the second major surface. The curved surface of the frame may have the same radius of curvature as the first radius of curvature. In the embodiments shown in FIGS. 17A-17I, the second major surface forms a concave surface that exhibits a greater compressive stress than the same surface exhibits prior to cold-bending. In some embodiments, the second major surface exhibits a greater compressive stress than the first major surface.

The thickness of the cold-bent glass substrate is about 1.5 mm or less. In one or more embodiments, the width of the cold-bent glass substrate is in a range from about 5 cm to about 250 cm, and the length of the cold-bent glass substrate is from about 5 cm to about 250 cm. In one or more embodiments, the first radius of curvature is 500 nm or greater. The glass substrate may be strengthened as described herein.

In one or more embodiments shown in FIGS. 17A-17I, the kit includes a display module. As shown in FIG. 17B and FIG. 17C, the display module includes a display including a second glass substrate 3030, and an optional backlight unit 3040. In some embodiments, the display module includes only a display (with no backlight unit 3040), as shown in FIG. 17E. In such embodiments, the backlight unit or other mechanism or structure may be provided separately, and attached as shown in FIG. 17F to maintain the curved shape of the cold-bent glass substrate and the second glass substrate after the removable frame is removed. In one or more embodiments, the display may be liquid crystal display or an OLED display. In one or more embodiments, the kit may include a touch panel instead of the display module or in addition to the display module (with the touch panel positioned to be disposed between the cold-bent glass substrate and the display module). In the embodiments shown in FIGS. 17B and 17C, the display or touch panel comprises a second glass substrate 3030 that is curved. In such embodiments, the second glass substrate comprises a curved display surface or curved touch panel surface having a second radius of curvature that is within 10% of the first radius of curvature. In one or more embodiments, the second glass substrate may curved and have sufficient rigidity or structure to maintain the cold-bent shape of the cold-bent glass after the removable frame is removed. In embodiments in which an OLED display is used, the OLED display or the curved surface of the base has a second radius of curvature that is within 10% of the first radius of curvature. In some embodiments, such as shown in FIGS. 17C, 17E, 17F, 17H and 17I, the kit comprises an adhesive layer 3050 for attachment of the second glass substrate to the cold-bent glass substrate (and specifically, the first major surface 3012). The adhesive layer may be provided on the cold-bent glass substrate (i.e., the first major surface), on the second glass substrate or both the cold-bent glass substrate and the second glass substrate. The adhesive 3050 may be an optically clear adhesive, such as the optically clear adhesives described herein. In one or more embodiments as shown in FIGS. 17B and 17C, after the curved cold-bent substrate 3010 and the curved second glass substrate 3030 are laminated, it is believed that such lamination exerts lower stress on any adhesive layer disposed therein. In one or more embodiments, after the cold-bent substrate 3010 and the curved second glass substrate 3030 are laminated, the second radius of curvature may be within 5%, within 4%, within 3% or within 2% of the first radius of curvature. In some embodiments, the cold-bent glass substrate and the second glass substrate are substantially aligned such that less than 2% of the width, less than 2% of the length or less than 2% of both the width and the length of the cold-bent glass is unaligned with the second glass substrate (i.e., unaligned portions are exposed), after lamination. In one or more embodiments, less than 5% of the surface area of the first major surface 2012 is unaligned with the second glass substrate or exposed after lamination. In some embodiments, the thickness of the adhesive may be increased to enhance alignment between the cold-bent glass substrate and the second glass substrate.

As shown in FIG. 17C, 17E, 17F, 17H or 17I, the kit may include a second glass substrate that is attached to the first major surface 3012. A shown in FIGS. 17D and 17G, the second glass substrate 3030 may be substantially flat and is cold-bendable to a second radius of curvature that is within 10% of the first radius of curvature. As shown in FIGS. 17D through 17F, the second glass substrate may be cold-bent to the second radius of curvature and may be attached to the cold-bent glass substrate (i.e., the first major surface 3012). In such embodiments, the second glass substrate 3030 or the cold-bent glass substrate 3010 may comprises an adhesive layer to attach the second glass substrate to the cold-bent glass substrate, as applicable. In one or more particular embodiments, the adhesive layer may be disposed on the first major surface. In such embodiments, the adhesive may be an optically clear adhesive that is a composite or exhibits different Young's modulus values on the surface in contact with or adjacent the first major surface, than the opposite surface that contacts or will contact the second glass substrate. It is believed that the second glass substrate may exert lower stress on the adhesive layer and thus a lower bending force is required to cold-bend the second glass substrate to the cold-bent glass substrate. In some such embodiments, the cold-bent glass substrate and the second glass substrate are substantially aligned such that less than 2% of the width, less than 2% of the length or less than 2% of both the width and the length of the cold-bent glass is unaligned with the second glass substrate (i.e., unaligned portions are exposed), after lamination. In one or more embodiments, less than 5% of the surface area of the first major surface 2012 is unaligned with the second glass substrate or exposed after lamination.

As shown in FIGS. 17B-17C and 17F, a curved backlight unit 3040 may be attached to the second glass substrate 3030. In some embodiments, the backlight unit 3040 exhibits a third radius of curvature that is within 10% of the first radius of curvature, within 10% of the second radius of curvature, or within 10% of the first radius of curvature and the second radius of curvature. In such embodiments, the backlight unit 3040 provides the structure to maintain the curved shape of the cold-bent glass substrate and the second glass substrate, after the removable frame is removed, as shown in FIGS. 17C and 17F. Where a touch panel is included, a corresponding structure is attached to the second substrate opposite the surface that is attached or will attach to the cold-bent glass substrate.

In the embodiments shown in FIGS. 17H-17I, the display comprises a second glass substrate 3030 that is substantially flat and is attached to the first major surface. In such embodiments, the frame 3020 maintains the curved shape of the cold-bent glass substrate, and the second glass substrate 3030 or the cold-bent glass substrate 3010 comprises an adhesive layer 3050 that attaches the second glass substrate to the first major surface. In such embodiments, the adhesive attaches a cold-bent glass substrate to a flat second glass substrate. A shown, in one or more embodiments, the adhesive layer comprises a first surface that is substantially flat and an opposing second surface having a second radius of curvature that is within the 10% of the first radius of curvature. In such embodiments, the adhesive may be a liquid optically clear adhesive. In some embodiments, the first radius of curvature is in a range from about 500 nm to about 1000 nm. In such embodiments, the adhesive layer is a structural adhesive that provides the structure to maintain the curved shape of the cold-bent glass substrate after the frame is removed, as shown in FIG. 17I.

In one or more embodiments, an air gap may be present between the second glass substrate and the cold-bent glass substrate (i.e., the first major surface). In such embodiments, the adhesive layer may be present on only a portion of the cold-bent glass substrate and/or the second glass substrate such that there is no attachment between a portion of the cold-bent glass substrate and the second glass substrate (as there is no adhesive present to form such attachment).

Figure 18A:
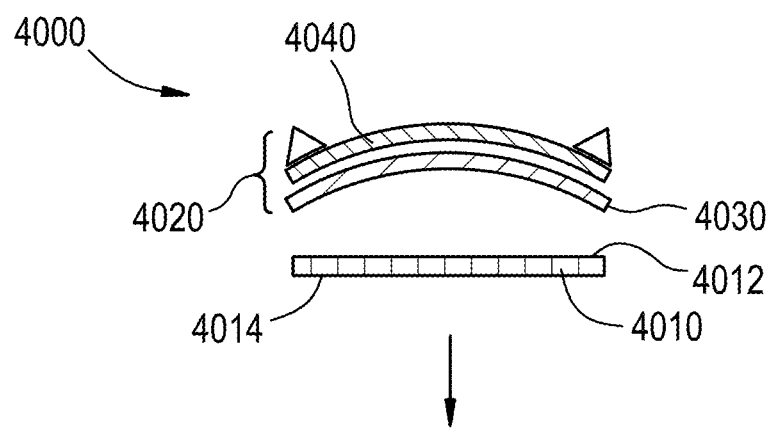
FIGS. 18A-18B are side views of a kit according to one or more embodiments.
Figure 18B:
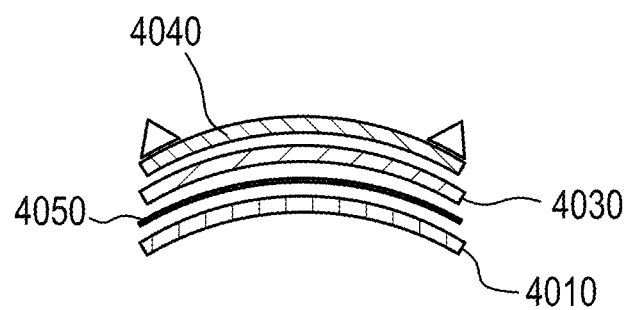

FIGS. 18A-18B illustrate a kit that includes a flexible glass substrate 4010 that comprises a first major surface, a second major surface opposing the first major surface and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width, and a curved display module 4020 or a curved touch panel having a first radius of curvature, as shown in FIG. 18A. FIGS. 18A-18B show a convex curvature with the flexible glass substrate 4010 disposed between a viewer and the display. In one or more embodiments, the curvature may be concave, or may have a combination of convex and concave portions having the same or different radii from one another.

The thickness of the flexible glass substrate 4010 is about 1.5 mm or less. In one or more embodiments, the width of the flexible glass substrate is in a range from about 5 cm to about 250 cm, and the length of the flexible glass substrate is from about 5 cm to about 250 cm. In one or more embodiments, the first radius of curvature is 500 nm or greater. In one or more embodiments, the flexible glass substrate may be strengthened as described herein.

As shown in FIG. 18A and FIG. 18B, the display module includes a display including a second glass substrate 4030, and a backlight unit 4040 or other structure for maintaining the curved shape of the curved display module 4020. In some embodiments, the display module includes only a display (with no backlight unit 4040), as shown in FIG. 16E and FIG. 18F. In such embodiments, the backlight unit or other structure may be provided separately, and attached to the display, as shown in FIG. 18G. In one or more embodiments, the display may be liquid crystal display or an OLED display. In the embodiments shown in FIG. 18B, the display comprises a second glass substrate 4030 that is curved and exhibits the first radius of curvature. In one or more embodiments, the kit includes a curved touch panel instead of the curved display module or in addition to the curved display module (with the touch panel positioned to be disposed between the cold-bent glass substrate and the curved display module). In such embodiments, the curved touch panel includes a second glass substrate that is curved, and which may optionally provide the structural rigidity to maintain its curved shape (even after attachment to the flexible glass substrate as shown in FIG. 18B). In some embodiments, the kit includes an adhesive layer 4050 for attachment of the second glass substrate 4030 to the flexible glass substrate 4010 (i.e., the first major surface 4012). The adhesive layer may be provided on the flexible glass substrate (i.e., the first major surface), on the second glass substrate or both the flexible glass substrate and the second glass substrate. The adhesive 4050 may be an optically clear adhesive, such as the optically clear adhesives described herein. In one or more embodiments, after the flexible glass substrate is cold-bent and laminated to the curved display module or touch panel, the second major surface 4014 exhibits a second radius of curvature that is within 10%, within 5%, within 4%, within 3% or within 2% of the first radius of curvature. In embodiments in which an OLED display is used, the OLED display or the curved surface of the base has a second radius of curvature that is within 10% of the first radius of curvature. In the embodiments shown in FIG. 18B, the second major surface forms a concave surface that exhibits a greater compressive stress than the same surface exhibits prior to cold-bending. In some embodiments, the second major surface exhibits a greater compressive stress than the first major surface.

In some embodiments, the resulting cold-bent glass substrate (and corresponding frame) and the second glass substrate are substantially aligned such that less than 2% of the width, less than 2% of the length or less than 2% of both the width and the length of the cold-bent glass is unaligned with the second glass substrate (i.e., unaligned portions are exposed), after lamination. In one or more embodiments, less than 5% of the surface area of the first major surface 2012 is unaligned with the second glass substrate or exposed after lamination. In some embodiments, the thickness of the adhesive may be increased to enhance alignment between the cold-bent glass substrate and the second glass substrate.

In one or more embodiments, after the flexible glass substrate 4010 is cold-bent and laminated to the curved second glass substrate 4030, it is believed that the stress exerted on any adhesive layer disposed therein may be minimized by minimizing the thickness of the flexible glass substrate (i.e., to the ranges described herein). In one or more embodiments, the kit includes a bezel formed on the flexible glass substrate to reduce stress on the flexible glass substrate when cold-bending.

As shown in FIG. 18B, the second glass substrate is attached to the first major surface 4012. A shown in FIG. 18A, the flexible glass substrate 4010 is substantially flat and is cold-bendable to a second radius of curvature that is within 10% of the first radius of curvature. As shown in FIG. 18B, the flexible glass substrate is cold-bent to the second radius of curvature and attached to the second glass substrate. As shown in FIGS. 18A-18B, the backlight unit is curved and provides the structure to maintain the cold-bent shape of the second glass substrate and the flexible glass substrate (after it is cold-bent to the second glass substrate). In some embodiments, the backlight unit exhibits a third radius of curvature that is within 10% of the first radius of curvature, within 10% of the second radius of curvature, or within 10% of the first radius of curvature and the second radius of curvature. In some embodiments, the second glass substrate is curved and can maintain the curved shape of the cold-bent glass substrate with the backlight unit or other structure.

In one or more embodiments, an air gap may be present between the second glass substrate and the cold-bent glass substrate (i.e., the first major surface). In such embodiments, the adhesive layer may be present on only a portion of the cold-bent glass substrate and/or the second glass substrate such that there is no attachment between a portion of the cold-bent glass substrate and the second glass substrate (as there is no adhesive present to form such attachment).

Figure 19A:
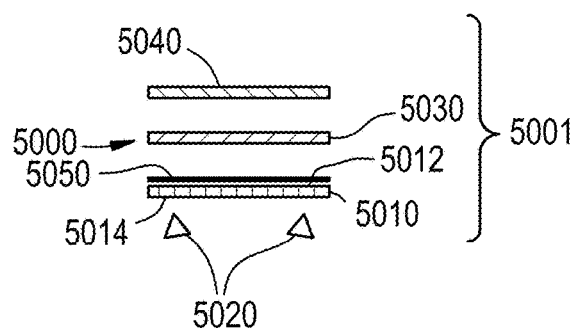
FIGS. 19A-19E are side view schematics illustrating one or more embodiments of a method for forming a display.
Figure 19B:
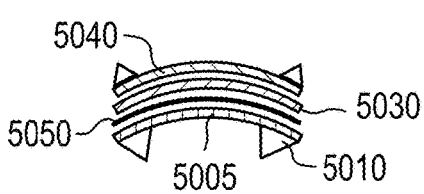
Figure 19C:
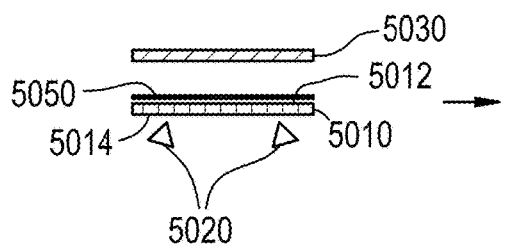
Figure 19D:
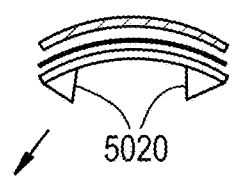

FIGS. 19A-19E illustrate embodiments of a method of forming a display. FIGS. 19A-19E show a convex curvature; however, the curvature may be concave, or may have a combination of convex and concave portions having the same or different radii from one another. In one or more embodiments, the method 5000 includes cold-bending a stack 5001 to a first radius of curvature as measured on a first surface 5005 of the stack. The stack may be a display stack, a touch panel stack or a stack that includes a touch panel and display. In one or more embodiments, the display may be liquid crystal display or an OLED display. The stack is shown in FIG. 19A and includes a first glass substrate 5010 having a first major surface 5012 forming the first surface of the display stack and a second major surface 5014 opposite the first major surface, a display and/or touch panel module disposed on the second major surface 5014. In the embodiment shown, the display and/or the touch panel include the second glass substrate 5030. In the embodiment shown in FIG. 19A, the stack is placed on a frame 5020 prior to and during cold-bending to maintain the cold-bent shape of the stack. It should be understood that the frame 5020 may have the features of the frame 158 described herein. In one or more embodiments, the method includes laminating the display and/or touch panel module to the second major surface such that second glass substrate (or other portion of the display and/or touch panel) comprises a second radius of curvature that is within 10% of the first radius of curvature. In one or more embodiments, the first radius of curvature is in a range from about 20 mm to about 1500 mm. In the embodiments shown in FIGS. 19A-19E, after cold-bending, the second major surface forms a concave surface that exhibits a greater compressive stress than the same surface exhibits prior to cold-bending. In some embodiments, the second major surface exhibits a greater compressive stress than the first major surface. In one or more embodiments, the method includes cold-bending the stack by applying a vacuum to the first surface to generate the first radius of curvature. In one or more embodiments, applying the vacuum comprises placing the stack on a vacuum fixture before applying the vacuum to the first surface. In the embodiment shown in FIG. 19A, the method includes applying an adhesive layer 5050 between the second glass substrate and the first glass substrate before cold-bending the stack. In some embodiments, the adhesive layer is disposed on a portion of the second glass substrate or the first glass substrate.

Figure 19E:
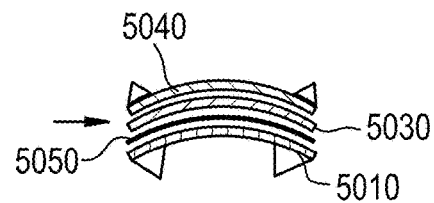

In the embodiment shown in FIG. 19A, the display module may include a cold-bendable backlight unit 5040 disposed on the second glass substrate opposite the first glass substrate. In the embodiment shown in FIGS. 19C through 19E, the module includes only a display or touch panel (with no backlight unit 5040). In such embodiments, the backlight unit or other mechanism or structure may be provided separately, and attached to the display or touch panel, as shown in FIG. 19E to maintain the curved shape of the display stack. In some embodiments, the frame 5020 may be removed if the backlight unit, second glass substrate, or other component provides adequate structure to maintain the curved shape of the cold-bent glass substrate. In some embodiments, the frame and the backlight unit cooperate together to maintain the cold-bent shape. Accordingly, in one or more embodiments, cold-bending and/or laminating a display stack comprises attaching a backlight unit to the second glass substrate opposite the first glass substrate, wherein the backlight unit is optionally curved to exhibit the second radius of curvature.

In one or more embodiments, the method includes attaching a frame to the first glass substrate to maintain the first radius of curvature, and simultaneously cold-bending and laminating the display stack.

In one or more embodiments, the first glass substrate is strengthened. In one or more embodiments, the second glass substrate is unstrengthened. In one or more embodiments, the second glass substrate has a thickness that is greater than a thickness of the glass substrate. In one or more embodiments, the method includes disposing the display in a vehicle interior system.

Example 1

Example 1 included a display formed from a 0.55 mm thick glass substrate that is chemically strengthened and exhibits a first radius of curvature of about 1000 mm. The glass substrate was provided flat and one major surface (the second major surface) was placed on a vacuum chuck having a radius of curvature of 1000 mm. The vacuum was applied to the major surface of the glass substrate to temporarily cold—from the glass substrate to exhibit a first radius of curvature of about 1000 mm, matching the radius of curvature of the vacuum chuck. If the vacuum was removed, the glass substrate would return to being flat and would no longer be cold-bent. While the glass substrate was disposed on the vacuum chuck and temporarily cold-bent, a layer of adhesive supplied by 3M corporation under the tradename 8215 having a thickness of 250 μm is applied to the first major surface of the glass substrate (i.e., the surface that is exposed and not in contact with the vacuum chuck). Normal force was applied to a roller to laminate the adhesive to the first major surface of the cold-bent glass substrate. The adhesive layer included a carrier film, which was removed after the adhesive layer was laminated to the cold-bent glass substrate.

A second glass substrate (which was a liquid crystal display glass substrate) was disposed on the adhesive layer. The second glass substrate was cold-bent and laminated to adhesive layer using a roller and applying normal force. During lamination of the second glass substrate, the glass substrate continued to be temporarily cold-bent using the vacuum. After lamination of the second glass substrate, a backlight and frame was applied to the second glass substrate. In Example 1, a double sided tape was applied between the frame and the glass substrate. The double sided tape was a double-sided acrylic foam tapes supplied by 3M Corporation under the trademark VHB™ Tapes. The frame had an L-shaped bezel. The assembly of the frame and backlight unit completed formation of the display. The vacuum was then removed from the glass substrate and the display was removed. The cold-bent glass substrate was permanently cold-bent and had a first radius of curvature. The display module (and particularly the second glass substrate) exhibited a second radius of curvature that approached or matched the first radius of curvature.

Aspect (1) pertains to a method of cold-bending a glass substrate comprising: supporting a glass substrate on a frame, wherein the glass substrate has a first major surface and a second major surface opposite the first major surface, wherein the frame has a curved support surface, wherein the first major surface of the glass substrate faces the curved support surface of the frame; and applying an air pressure differential to the glass substrate while supported by the frame causing the glass substrate to bend such that the glass substrate conforms to the curved shape of the curved support surface of the frame, forming a curved glass substrate, wherein the first major surface of the curved glass substrate includes a curved section and the second major surface of the curved glass substrate includes a curved section; wherein during application of the air pressure differential, a maximum temperature of the glass substrate is less than a glass softening point of the glass substrate.

Aspect (2) pertains to the method of Aspect (1), further comprising: applying an adhesive between the curved support surface of the frame and the first major surface of the glass substrate; and bonding the first major surface of the glass substrate to the support surface of the frame with the adhesive during application of the air pressure differential.

Aspect (3) pertains to the method of Aspect (2), wherein the adhesive is a heat-curable adhesive, wherein the bonding step comprises heating the glass substrate while supported by the frame to a temperature at or above a cure temperature of the heat-curable adhesive and less than a glass softening point of the glass substrate.

Aspect (4) pertains to the method of any one of Aspects (1) through (3), wherein applying the air pressure differential comprises generating a vacuum around the glass substrate and the frame.

Aspect (5) pertains to the method of Aspect (4), wherein the vacuum is generated by a vacuum fixture that supports the glass substrate on the frame.

Aspect (6) pertains to the method of Aspect (4), further comprising surrounding the glass substrate and the frame within an airtight enclosure, wherein the vacuum is applied to the airtight enclosure.

Aspect (7) pertains to the method of Aspect (6), wherein the airtight enclosure is a flexible polymer shell.

Aspect (8) pertains to the method of any one of Aspects (1) through (3), wherein applying the air pressure differential comprises increasing air pressure around the glass substrate and the frame.

Aspect (9) pertains to the method of Aspect (8), comprising surrounding the glass substrate and the frame within an overpressure device, wherein the air pressure is increased within the overpressure device.

Aspect (10) pertains to the method of any one of Aspects (1) through (9), wherein the curved support surface of the frame comprises a concave curved section and/or a convex curved section, and wherein the glass substrate is bent such that the first major surface includes a concave curved section and/or a convex curved section.

Aspect (11) pertains to the method of any one of Aspects (1) through (10), wherein the glass substrate is a strengthened piece of glass material such that the first major surface is under a compressive stress, $CS_1$, and the second major surface is under a compressive stress, $CS_2$, wherein prior to bending $CS_1$ equals $CS_2$, and following bending $CS_1$ is different than $CS_2$.

Aspect (12) pertains to the method of Aspect (11), wherein the curved section of the first major surface is a concave section and the curved section of the second major surface is a convex section, wherein following bending, $CS_1$ is greater than $CS_2$.

Aspect (13) pertains to the method of Aspect (11) or Aspect (12), wherein the glass substrate is at least one of chemically strengthen and thermally strengthened.

Aspect (14) pertains to the method of any one of Aspects (1) through (13), wherein a maximum thickness of the glass substrate measured between the first and second major surfaces is less than or equal to 1.5 mm.

Aspect (15) pertains to the method of any one of Aspects (1) through (13), wherein a maximum thickness of the glass substrate measured between the first and second major surfaces is 0.3 mm to 0.7 mm.

Aspect (16) pertains to the method of any one of Aspects (1) through (15), wherein the curved section of the first major surface is a concave section and the curved section of the second major surface a convex section, wherein the first major surface includes a second curved section having a convex shape, and the second major surface includes a second curved section having a concave shape.

Aspect (17) pertains to the method of any one of Aspects (1) through (16), further comprising attaching a display module to the frame.

Aspect (18) pertains to the method of Aspect (17), wherein attaching the display module comprises bonding the display module to the frame an adhesive during application of the air pressure differential.

Aspect (19) pertains to the method of Aspect (18), wherein the adhesive bonding of the display module to the frame is an optically clear adhesive.

Aspect (20) pertains to the method of any one of Aspects (1) through (19), wherein the temperature of the glass substrate is not raised above the glass softening point during or after bending, wherein the curved glass substrate has an optical property that is superior to the optical property of a glass substrate bent to a curved shape by heating to a temperature above the glass softening point.

Aspect (21) pertains to a vehicle interior system comprising: a base having a curved surface; a display disposed on the curved surface, the display comprising a curved glass substrate comprises a first major surface, a second major surface opposing the first major surface and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width, and wherein the thickness is 1.5 mm or less, and wherein the second major surface comprises a first radius of curvature of 20 mm or greater; and a display module attached to the second major surface and comprising a second radius of curvature, wherein the first radius of curvature is within 10% of one of or both the radius of curvature of the curved surface and the second radius of curvature.

Aspect (22) pertains to the vehicle interior system of Aspect (21), wherein the width is in a range from about 5 cm to about 250 cm, and the length is from about 5 cm to about 250 cm.

Aspect (23) pertains to the vehicle interior system of Aspect (21) or (22), wherein the curved glass substrate is strengthened.

Aspect (24) pertains to the vehicle interior system of any one of Aspects (21) through (23), wherein the curved glass substrate is cold-bent.

Aspect (25) pertains to the vehicle interior system of any one of Aspects (21) through (24), further comprising an adhesive between the glass substrate and the display module.

Aspect (26) pertains to the vehicle interior system of Aspect (25), wherein the glass substrate comprises a periphery adjacent the minor surface, and the adhesive is disposed between the periphery of the second major surface and the display module.

Aspect (27) pertains to the vehicle interior system of any one of Aspects (21) through (26), wherein the display module comprises a second glass substrate and a backlight unit, wherein the second glass substrate is disposed adjacent the first major surface and between the backlight unit and the first major surface, and wherein the backlight unit is optionally curved to exhibit the second radius of curvature.

Aspect (28) pertains to the vehicle interior system of Aspect (27), wherein the second glass substrate comprises a curved second glass substrate that is optionally cold-bent.

Aspect (29) pertains to the vehicle interior system of Aspect (27) or (28), wherein the display module further comprises a frame at least partially surrounding the backlight unit.

Aspect (30) pertains to the vehicle interior system of Aspect (29), wherein the frame at least partially surrounds the second glass substrate.

Aspect (31) pertains to the vehicle interior system of Aspect (29) or (30), wherein the frame at least partially surrounds the minor surface of the glass substrate.

Aspect (32) pertains to the vehicle interior system of Aspect (29) or (30), wherein the minor surface of the glass substrate is not surrounded by the frame.

Aspect (33) pertains to the vehicle interior system of Aspect (29), wherein the frame comprises an L-shape.

Aspect (34) pertains to the vehicle interior system of any one of Aspects (21) through (33), wherein either one of or both the first major surface and the second major surface comprises a surface treatment.

Aspect (35) pertains to the vehicle interior system of Aspect (34), wherein the surface treatment covers at least a portion of the first major surface and the second major surface.

Aspect (36) pertains to the vehicle interior system of Aspect (34) or (35), wherein the surface treatment comprises any one of an easy-to-clean surface, an anti-glare surface, an anti-reflective surface, a haptic surface, and a decorative surface.

Aspect (37) pertains to the vehicle interior system of Aspect (36), wherein the surface treatment comprises at least two of any one of an easy-to-clean surface, an anti-glare surface, an anti-reflective surface, a haptic surface, and a decorative surface.

Aspect (38) pertains to the vehicle interior system of Aspect (37), wherein the first major surface comprises the anti-glare surface and the second major surface comprises the anti-reflective surface.

Aspect (39) pertains to the vehicle interior system of Aspect (37), wherein the first major surface comprises the anti-reflective surface and the second major surface comprises the anti-glare surface.

Aspect (40) pertains to the vehicle interior system of Aspect (37), wherein the first major surface comprises either one of or both the anti-glare surface and the anti-reflective surface, and the second major surface comprises the decorative surface.

Aspect (41) pertains to the vehicle interior system of Aspect (37), wherein the decorative surface is disposed on at least a portion of the periphery and the interior portion is substantially free of the decorative surface.

Aspect (42) pertains to the vehicle interior system of any one of Aspects (36) through (41), wherein the decorative surface comprises any one of a wood-grain design, a brushed metal design, a graphic design, a portrait, and a logo.

Aspect (43) pertains to the vehicle interior system of any one of Aspects (36) through (42), wherein the anti-glare surface comprises an etched surface, and wherein the anti-reflective surface comprises a multi-layer coating.

Aspect (44) pertains to the vehicle interior system of any one of Aspects (21) through (43), further comprising touch functionality.

Aspect (45) pertains to the vehicle interior system of any one of Aspects (21) through (44), wherein the base comprises any one of a center console, a dashboard, an arm rest, a pillar, a seat back, a floor board, a headrest, a door panel, and a steering wheel.

Aspect (46) pertains to the vehicle interior system of any one of Aspects (21) through (45), wherein the vehicle is any one of an automobile, a seacraft, and an aircraft.

Aspect (47) pertains to a method of forming a display comprising: cold-bending a glass substrate having a first major surface and a second major surface opposite the first major surface to a first radius of curvature as measured on the second major surface; and laminating a display module to the first major surface while maintaining the first radius of curvature in the glass substrate to form the display, wherein the display module has a second radius of curvature that is within 10% of the first radius of curvature.

Aspect (48) pertains to the method of Aspect (47), wherein cold-bending the glass substrate comprises applying a vacuum to the second major surface to generate the first radius of curvature.

Aspect (49) pertains to the method of Aspect (48), wherein applying the vacuum comprises placing the glass substrate on a vacuum fixture before applying the vacuum to the second major surface.

Aspect (50) pertains to the method of any one of Aspects (47) through (49), further comprising laminating an adhesive to the first major surface before laminating the display module to the first major surface such that the adhesive is disposed between the first major surface and the display module.

Aspect (51) pertains to the method of any one of Aspects (47) through (50), wherein laminating a display module comprises laminating a second glass substrate to the glass substrate; and attaching a backlight unit to the second glass substrate, wherein the backlight unit is optionally curved to exhibit the second radius of curvature.

Aspect (52) pertains to the method of Aspect (51), wherein laminating the second glass substrate comprises cold-bending the second glass substrate.

Aspect (53) pertains to the method of Aspect (51) or Aspect (52), further comprising attaching a frame with the backlight unit to the second glass substrate.

Aspect (54) pertains to the method of any one of Aspects (51) through (53), wherein the adhesive is disposed between the second glass substrate and the glass substrate.

Aspect (55) pertains to the method of any one of Aspects (48) through (54), further comprising removing the vacuum from the second major surface.

Aspect (56) pertains to the method of Aspect (55), wherein removing the vacuum from the second major surface comprises removing the display from the vacuum fixture.

Aspect (57) pertains to the method of any one of Aspects (47) through (56), wherein the glass substrate has a thickness of about 1.5 mm or less.

Aspect (58) pertains to the method of any one of Aspects (47) through (57), wherein the glass substrate is strengthened.

Aspect (59) pertains to the method of any one of Aspects (47) through (58), wherein the second glass substrate is unstrengthened.

Aspect (60) pertains to the method of any one of Aspects (51) through (59), wherein the second glass substrate has a thickness that is greater than a thickness of the glass substrate.

Aspect (61) pertains to the method of any one of Aspects (47) through (60), wherein the first radius of curvature is in a range from about 20 mm to about 1500 mm.

Aspect (62) pertains to the method of any one of Aspects (50) through (61), wherein the adhesive has a thickness of about 1 mm or less.

Aspect (63) pertains to the method of any one of Aspects (47) through (62), further comprising disposing the display in a vehicle interior system.

Aspect (64) pertains to a kit for providing a vehicle interior system, the kit comprising: a curved glass substrate that comprises a first major surface, a second major surface opposing the first major surface and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width, and wherein the thickness is 1.5 mm or less, and wherein the second major surface comprises a first radius of curvature; and a frame having a curved surface having the first radius of curvature, wherein the curved surface is coupled to the second major surface of the curved glass substrate.

Aspect (65) pertains to the kit of Aspect (64), wherein the first radius of curvature is 250 nm or greater and wherein the width is in a range from about 5 cm to about 250 cm, and the length is from about 5 cm to about 250 cm.

Aspect (66) pertains to the kit of Aspect (64) or (65), wherein the curved glass substrate is cold-bent.

Aspect (67) pertains to the kit of any one of Aspects (64) through (66), further comprising a display module, a touch panel, or a display module and a touch panel.

Aspect (68) pertains to the kit of Aspect (67), wherein the display module comprises a display and a back-light unit.

Aspect (69) pertains to the kit of Aspect (68), wherein the display is a liquid crystal display or an organic light-emitting diode display.

Aspect (70) pertains to the kit of Aspect (68) or Aspect (69), wherein the display comprises a second glass substrate that is curved.

Aspect (71) pertains to the kit of Aspect (65), wherein the touch panel comprises a second glass substrate that is curved.

Aspect (72) pertains to the kit of Aspect (70) or Aspect (71), wherein the second glass substrate comprises a display surface having a second radius of curvature that is within 10% of the first radius of curvature.

Aspect (73) pertains to the kit of any one of Aspects (70) through (72), wherein the second glass substrate comprises an adhesive layer for attachment to the curved glass substrate or the frame.

Aspect (74) pertains to the kit of any one of Aspects (70) through (73), wherein the second glass substrate is attached to the first major surface or the frame, and the backlight unit is configured for attachment to the second glass substrate such that the second glass substrate is between the curved glass substrate and the backlight unit.

Aspect (75) pertains to the kit of any one of Aspects (68) through (69), wherein the display comprises a second glass substrate that is substantially flat and is cold-bendable to a second radius of curvature that is within 10% of the first radius of curvature.

Aspect (76) pertains to the kit of Aspect (67), wherein the touch panel comprises a second glass substrate that is substantially flat and is cold-bendable to a second radius of curvature that is within 10% of the first radius of curvature.

Aspect (77) pertains to the kit of Aspect (75) or (76), wherein the second glass substrate comprises an adhesive layer for attachment to the cold-bent glass substrate or the frame.

Aspect (78) pertains to the kit of any one of Aspects (75) through (77), wherein the second glass substrate is cold-bent to the second radius of curvature and attached to the cold-bent glass substrate or the frame.

Aspect (79) pertains to the kit of any one of Aspects (68) through (69), Aspects (71) through (75) and Aspects (77) through (78), wherein the backlight unit is curved and exhibits a third radius of curvature that is within 10% of the first radius of curvature.

Aspect (80) pertains to the kit of any one of Aspects (71) through (79), wherein the backlight unit is curved and exhibits a third radius of curvature that is within 10% of the second radius of curvature.

Aspect (81) pertains to the kit of any one of Aspects (71) through (80), wherein the backlight unit is curved and exhibits a third radius of curvature that is within 10% of the first radius of curvature and the second radius of curvature.

Aspect (82) pertains to the kit of Aspect (68) or (69), wherein the display comprises a second glass substrate that is substantially flat and is attached to the first major surface, and the backlight unit is configured for attachment to the second glass substrate such that the second glass substrate is between the curved glass substrate and the backlight unit.

Aspect (83) pertains to the kit of Aspect (67), wherein the touch panel comprises a second glass substrate that is substantially flat and is attached to the first major surface.

Aspect (84) pertains to the kit of Aspect (82) or (83), wherein the second glass substrate comprises an adhesive layer that attaches the second glass substrate to the first major surface, wherein the adhesive layer comprises a first surface that is substantially flat and an opposing second surface having a second radius of curvature that is within the 10% of the first radius of curvature.

Aspect (85) pertains to the kit of any one of Aspects (74), and (78) through (84), further comprising an air gap disposed between the second glass substrate and the first major surface.

Aspect (86) pertains to a kit for providing a vehicle interior system, the kit comprising: a curved glass substrate that comprises a first major surface, a second major surface opposing the first major surface and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width, and wherein the thickness is 1.5 mm or less, and wherein the second major surface comprises a first radius of curvature; and a removable frame having a curved surface having the first radius of curvature, wherein the curved surface is removably coupled to the second major surface of the curved glass substrate.

Aspect (87) pertains to the kit of Aspect (86), wherein the first radius of curvature is 250 nm or greater and wherein the width is in a range from about 5 cm to about 250 cm, and the length is from about 5 cm to about 250 cm.

Aspect (88) pertains to the kit of Aspect (86) or (87), wherein the curved glass substrate is cold-bent.

Aspect (89) pertains to the kit of any one of Aspects (86) through (88), further comprising a display module, a touch panel, or a display module and a touch panel.

Aspect (90) pertains to the kit of Aspect (89), wherein the display module comprises a display and a backlight unit.

Aspect (91) pertains to the kit of Aspect (90), wherein the display is a liquid crystal display or an organic light-emitting diode display.

Aspect (92) pertains to the kit of Aspect (90) or (91), wherein the display comprises a second glass substrate that is curved.

Aspect (93) pertains to the kit of Aspect (89), wherein the touch panel comprises a second glass substrate that is curved.

Aspect (94) pertains to the kit of Aspect (92) or (93), wherein the second glass substrate comprises a display surface having a second radius of curvature that is within 10% of the first radius of curvature.

Aspect (95) pertains to the kit of any one of Aspects (92) through (94), wherein the second glass substrate comprises an adhesive layer for attachment to the curved glass substrate.

Aspect (96) pertains to the kit of any one of Aspects (90) through (95), wherein the second glass substrate is attached to the first major surface, and the backlight unit is configured for attachment to the second glass substrate such that the second glass substrate is between the curved glass substrate and the backlight unit.

Aspect (97) pertains to the kit of Aspect (90) or (91), wherein the display comprises a second glass substrate that is substantially flat and is cold-bendable to a second radius of curvature that is within 10% of the first radius of curvature.

Aspect (98) pertains to the kit of Aspect (89), wherein the touch panel comprises a second glass substrate that is substantially flat and is cold-bendable to a second radius of curvature that is within 10% of the first radius of curvature.

Aspect (99) pertains to the kit of Aspect (97) or (98), wherein the second glass substrate comprises an adhesive layer for attachment to the curved glass substrate.

Aspect (100) pertains to the kit of any one of Aspects (97) through (99), wherein the second glass substrate is cold-bent to the second radius of curvature and attached to the curved glass substrate, and the backlight unit is configured for attachment to the second glass substrate such that the second glass substrate is between the curved glass substrate and the backlight unit.

Aspect (101) pertains to the kit of any one of Aspects (90) through (92), Aspects (94) through (97), and Aspects (99) through (100), wherein the backlight unit is curved and exhibits a third radius of curvature that is within 10% of the first radius of curvature.

Aspect (102) pertains to the kit of any one of Aspects (97) through (101), wherein the backlight unit is curved and exhibits a third radius of curvature that is within 10% of the second radius of curvature.

Aspect (103) pertains to the kit of any one of Aspects (97) through (102), wherein the backlight unit is curved and exhibits a third radius of curvature that is within 10% of the first radius of curvature and the second radius of curvature.

Aspect (104) pertains to the kit of Aspect (90) or (91), wherein the display comprises a second glass substrate that is substantially flat and is attached to the first major surface, and the backlight unit is configured for attachment to the second glass substrate such that the second glass substrate is between the curved glass substrate and the backlight unit.

Aspect (105) pertains to the kit of Aspect (89), wherein the touch panel comprises a second glass substrate that is substantially flat and is attached to the first major surface.

Aspect (106) pertains to the kit of Aspect (104) or (105), wherein the second glass substrate comprises an adhesive layer that attaches the second glass substrate to the first major surface.

Aspect (107) pertains to the kit of Aspect (106), wherein the adhesive layer comprises a first surface have in that is substantially flat and an opposing second surface having a second radius of curvature that is within the 10% of the first radius of curvature.

Aspect (108) pertains to the kit of any one of Aspect (96) and Aspects (100) through (107), further comprising an air gap disposed between the second glass substrate and the first major surface.

Aspect (109) pertains to a kit for providing a vehicle interior system, the kit comprising: a flexible glass substrate that comprises a first major surface, a second major surface opposing the first major surface and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width, and wherein the thickness is 1.5 mm or less; and a curved display module or curved touch panel having a first radius of curvature.

Aspect (110) pertains to the kit of Aspect (109), wherein the first radius of curvature is 500 nm or greater.

Aspect (111) pertains to the kit of Aspect (109) or (110), wherein the width is in a range from about 5 cm to about 250 cm, and the length is from about 5 cm to about 250 cm.

Aspect (112) pertains to the kit of any one of Aspects (109) through (111), wherein the display module comprises a display and a backlight unit.

Aspect (113) pertains to the kit of Aspect (112), wherein the display is a liquid crystal display or an organic light-emitting diode display.

Aspect (114) pertains to the kit of any one of Aspects (112) through (113), wherein the display module comprises a second glass substrate with a second glass surface, the second glass surface comprises the first radius of curvature.

Aspect (115) pertains to the kit of any one of Aspects (109) through (111), wherein the touch panel comprises a second glass substrate with a second glass surface, the second glass surface comprises the first radius of curvature.

Aspect (116) pertains to the kit of Aspect (114) or (115), wherein the flexible glass substrate is cold-bent and the second major surface of the flexible glass substrate comprises a second radius of curvature that is within 10% of the first radius of curvature.

Aspect (117) pertains to the kit of any one of Aspects (114) through (116), wherein either one of or both the first major surface and the second glass surface comprises an adhesive layer for attachment of the flexible glass substrate and the second glass substrate.

Aspect (118) pertains to the kit of any one of Aspects (114) through (117), wherein the second glass substrate is attached to the first major surface, and the backlight unit is configured for attachment to the second glass substrate such that the second glass substrate is between the curved glass substrate and the backlight unit.

Aspect (119) pertains to the kit of any one of Aspects (112) through (114) and Aspects (116) through (118), wherein the backlight unit is curved and exhibits a third radius of curvature that is within 10% of the first radius of curvature.

Aspect (120) pertains to the kit of any one of Aspects (116) through (119), wherein the backlight unit is curved and exhibits a third radius of curvature that is within 10% of the second radius of curvature.

Aspect (121) pertains to the kit of any one of Aspects (116) through (120), wherein the backlight unit is curved and exhibits a third radius of curvature that is within 10% of the first radius of curvature and the second radius of curvature.

Aspect (122) pertains to the kit of any one of Aspects (118) through (121), further comprising an air gap disposed between the second glass substrate and the first major surface.

Aspect (123) pertains to a method of forming a display comprising: cold-bending a stack to a first radius of curvature as measured on a first surface, the stack comprising a first glass substrate having a first major surface forming the first surface of the stack and a second major surface opposite the first major surface, a display module or touch panel comprising a second glass substrate disposed on the second major surface, wherein the second glass substrate is adjacent the second major surface; and laminating the display module or touch panel to the second major surface such that second glass substrate comprises a second radius of curvature that is within 10% of the first radius of curvature.

Aspect (124) pertains to the method of Aspect (123), wherein cold-bending the stack comprises applying a vacuum to the first surface to generate the first radius of curvature.

Aspect (125) pertains to the method of Aspect (124), wherein applying the vacuum comprises placing the stack on a vacuum fixture before applying the vacuum to the first surface.

Aspect (126) pertains to the method of any one of Aspects (123) through (125), further comprising applying an adhesive layer between the second glass substrate and the first glass substrate before cold-bending the stack.

Aspect (127) pertains to the method of Aspect (126), wherein the adhesive layer is disposed on a portion of the second glass substrate or the first glass substrate.

Aspect (128) pertains to the method of any one of Aspects (123) through (127), wherein the display module comprises a cold-bendable backlight unit disposed on the second glass substrate opposite the first glass substrate.

Aspect (129) pertains to the method of any one of Aspects (123) through (127), wherein laminating a display module comprises attaching a backlight unit to the second glass substrate opposite the first glass substrate, wherein the backlight unit is optionally curved to exhibit the second radius of curvature.

Aspect (130) pertains to the method of any one of Aspects (123) through (128), further comprising attaching a frame to the first glass substrate to maintain the first radius of curvature.

Aspect (131) pertains to the method of any one of Aspects (123) through (130), wherein the first glass substrate has a thickness of about 1.5 mm or less.

Aspect (132) pertains to the method of any one of Aspects (123) through (131), wherein the first glass substrate is strengthened.

Aspect (133) pertains to the method of any one of Aspects (123) through (132), wherein the second glass substrate is unstrengthened.

Aspect (134) pertains to the method of any one of Aspects (123) through (133), wherein the second glass substrate has a thickness that is greater than a thickness of the glass substrate.

Aspect (135) pertains to the method of any one of Aspects (123) through (134), wherein the first radius of curvature is in a range from about 20 mm to about 1500 mm.

Aspect (136) pertains to the method of any one of Aspects (123) through (135), further comprising disposing the display in a vehicle interior system.

It will be apparent to those skilled in the art that various modifications and variations can be made without departing from the spirit or scope of the invention.

What is claimed is:

1. A vehicle interior system comprising
   a base having a curved surface;
   a display disposed on the curved surface, the display comprising
      a curved and cold-bent glass substrate comprising a first major surface, a second major surface opposing the first major surface and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width, and wherein the thickness is 1.5 mm or less, the width is in a range from about 5 cm to about 250 cm, and the length is from about 5 cm to about 250 cm, and wherein the second major surface comprises a first radius of curvature of 20 mm or greater; and
      a display module attached to the second major surface and comprising a second radius of curvature,
      wherein the first radius of curvature is within 10% of one of or both the radius of curvature of the curved surface and the second radius of curvature.

2. The vehicle interior system of claim 1, wherein the curved glass substrate is strengthened.

3. The vehicle interior system of claim 1, further comprising an adhesive between the glass substrate and the display module.

4. The vehicle interior system of claim 1, wherein the display module comprises a second glass substrate and a backlight unit, wherein the second glass substrate is disposed adjacent the first major surface and between the backlight unit and the first major surface, and wherein the backlight unit is optionally curved to exhibit the second radius of curvature.

5. The vehicle interior system of claim 4, wherein the second glass substrate comprises a curved second glass substrate that is cold-bent.

6. The vehicle interior system of claim 4, wherein the display module further comprises a frame at least partially surrounding the backlight unit, at least partially surrounds the second glass substrate, or at least partially surrounds the minor surface of the glass substrate.

7. The vehicle interior system of claim 6, wherein the minor surface of the glass substrate is not surrounded by the frame.

8. The vehicle interior system of claim 6, wherein the frame comprises an L-shape.

9. The vehicle interior system of claim 1, wherein either one of or both the first major surface and the second major surface comprises a surface treatment wherein the surface treatment comprises any one of an easy-to-clean surface, an anti-glare surface, an anti-reflective surface, a haptic surface, and a decorative surface.

10. The vehicle interior system of claim 1, further comprising touch functionality.

11. The vehicle interior system of claim 1, wherein the base comprises any one of a center console, a dashboard, an arm rest, a pillar, a seat back, a floor board, a headrest, a door panel, and a steering wheel.

12. The vehicle interior system of claim 1, wherein the vehicle is any one of an automobile, a seacraft, and an aircraft.

13. A vehicle interior system comprising
a base having a curved surface;
a display disposed on the curved surface, the display comprising
a curved and cold-bent glass substrate comprising a first major surface, a second major surface opposing the first major surface, and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width, and wherein the thickness is 1.5 mm or less, and wherein the second major surface comprises a first radius of curvature of 20 mm or greater;
a display module attached to the second major surface and comprising a second radius of curvature; and
an adhesive between the glass substrate and the display module, wherein the glass substrate comprises a periphery adjacent the minor surface, and the adhesive is disposed between the periphery of the second major surface and the display module,
wherein the first radius of curvature is within 10% of one of or both the radius of curvature of the curved surface and the second radius of curvature.

14. The vehicle interior system of claim 13, wherein the width is in a range from about 5 cm to about 250 cm, and the length is from about 5 cm to about 250 cm.

15. The vehicle interior system of claim 13, wherein the curved glass substrate is strengthened.

16. The vehicle interior system of claim 13, wherein either one of or both the first major surface and the second major surface comprises a surface treatment wherein the surface treatment comprises any one of an easy-to-clean surface, an anti-glare surface, an anti-reflective surface, a haptic surface, and a decorative surface.

17. The vehicle interior system of claim 13, further comprising touch functionality.

18. The vehicle interior system of claim 13, wherein the base comprises any one of a center console, a dashboard, an arm rest, a pillar, a seat back, a floor board, a headrest, a door panel, and a steering wheel.

19. A vehicle interior system comprising
a base having a curved surface;
a display disposed on the curved surface, the display comprising
a curved and cold-bent glass substrate comprising a first major surface, a second major surface opposing the first major surface and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width, and wherein the thickness is 1.5 mm or less, and wherein the second major surface comprises a first radius of curvature of 20 mm or greater; and
a display module attached to the second major surface and comprising a second radius of curvature and a second glass substrate and a backlight unit, wherein the second glass substrate is disposed adjacent the first major surface and between the backlight unit and the first major surface, and wherein the backlight unit is optionally curved to exhibit the second radius of curvature,
wherein the first radius of curvature is within 10% of one of or both the radius of curvature of the curved surface and the second radius of curvature.

20. The vehicle interior system of claim 19, wherein the width is in a range from about 5 cm to about 250 cm, and the length is from about 5 cm to about 250 cm.

21. The vehicle interior system of claim 19, wherein the curved glass substrate is strengthened.

22. The vehicle interior system of claim 19, wherein the display module further comprises a frame at least partially surrounding the backlight unit, at least partially surrounds the second glass substrate, or at least partially surrounds the minor surface of the glass substrate.

23. The vehicle interior system of claim 19, wherein either one of or both the first major surface and the second major surface comprises a surface treatment wherein the surface treatment comprises any one of an easy-to-clean surface, an anti-glare surface, an anti-reflective surface, a haptic surface, and a decorative surface.

24. The vehicle interior system of claim 19, further comprising touch functionality.

25. The vehicle interior system of claim 19, wherein the base comprises any one of a center console, a dashboard, an arm rest, a pillar, a seat back, a floor board, a headrest, a door panel, and a steering wheel.

26. A vehicle interior system comprising
a base having a curved surface;
a display disposed on the curved surface, the display comprising
a curved and cold-bent glass substrate comprising a first major surface, a second major surface opposing the first major surface and a minor surface connecting the first major surface and the second major surface, a thickness defined as a distance between the first major surface and the second major surface, a width defined as a first dimension of one of the first or second major surfaces orthogonal to the thickness, and a length defined as a second dimension of one of the first or second major surfaces orthogonal to both the thickness and the width, and wherein the thickness is 1.5 mm or less, and wherein the second major surface comprises a first radius of curvature of 20 mm or greater; and
a display module attached to the second major surface and comprising a second radius of curvature,
wherein the first radius of curvature is within 10% of one of or both the radius of curvature of the curved surface and the second radius of curvature, and
wherein either one of or both the first major surface and the second major surface comprises a surface treatment wherein the surface treatment comprises any one of an easy-to-clean surface, an anti-glare surface, an anti-reflective surface, a haptic surface, and a decorative surface.

27. The vehicle interior system of claim 26, the width is in a range from about 5 cm to about 250 cm, and the length is from about 5 cm to about 250 cm.

28. The vehicle interior system of claim 26, wherein the curved glass substrate is strengthened.

29. The vehicle interior system of claim 26, further comprising touch functionality.

30. The vehicle interior system of claim 26, wherein the base comprises any one of a center console, a dashboard, an arm rest, a pillar, a seat back, a floor board, a headrest, a door panel, and a steering wheel.

* * * * *